(12) United States Patent
Klinkan et al.

(10) Patent No.: US 11,196,609 B2
(45) Date of Patent: Dec. 7, 2021

(54) INTERPOLATION METHOD FOR POLAR SIGNALS IN RADIO FREQUENCY TRANSMITTERS

(71) Applicant: Intel IP Corporation, Santa Clara, CA (US)

(72) Inventors: Alexander Klinkan, Linz (AT); Eugen Pfann, Linz (AT)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 16/489,850

(22) PCT Filed: Mar. 30, 2017

(86) PCT No.: PCT/US2017/024962
§ 371 (c)(1),
(2) Date: Aug. 29, 2019

(87) PCT Pub. No.: WO2018/182606
PCT Pub. Date: Oct. 4, 2018

(65) Prior Publication Data
US 2020/0021477 A1    Jan. 16, 2020

(51) Int. Cl.
*H04L 27/36* (2006.01)
*H04B 1/04* (2006.01)
(Continued)

(52) U.S. Cl.
CPC ......... *H04L 27/361* (2013.01); *H04B 1/0475* (2013.01); *H04L 27/0008* (2013.01);
(Continued)

(58) Field of Classification Search
CPC . H04L 27/361; H04L 27/0008; H04L 27/364; H04L 27/366; H04L 27/365; H04L 27/367; H04B 1/0475; H04B 14/008
See application file for complete search history.

(56) References Cited

U.S. PATENT DOCUMENTS

| | | | | |
|---|---|---|---|---|
| 2012/0063536 A1* | 3/2012 | Bode | ............ | H04B 1/0483 |
| | | | | 375/295 |
| 2013/0022148 A1* | 1/2013 | Sagi | ............ | H04L 27/361 |
| | | | | 375/296 |
| 2015/0363362 A1* | 12/2015 | Menkhoff | ............ | H04L 27/361 |
| | | | | 708/290 |

OTHER PUBLICATIONS

International Preliminary Report on Patentability dated Oct. 1, 2019 for International Application No. PCT/US2017/024962.

* cited by examiner

*Primary Examiner* — Walli Z Butt
(74) *Attorney, Agent, or Firm* — 2SPL Patent Attorneys PartG mbB; Yong Beom Hwang

(57) ABSTRACT

An apparatus for interpolation of polar signals in RF transmitters is disclosed. The apparatus comprises an estimation circuit configured to receive an input in-phase (I) quadrature (Q) signal comprising a plurality of input IQ samples having a first sampling rate associated therewith, and determine a selection metric value indicative of a position of an IQ trajectory associated with one or more input IQ samples of the input IQ signal. The apparatus further comprises a selection circuit configured to receive the input IQ signal and the selection metric value; and adaptively provide the input IQ signal to a first interpolation circuit that implements a first interpolation method or to a second interpolation circuit that implements a second, different interpolation method, for generating interpolated polar samples at a second, different sampling rate, from the input IQ signal, based on the selection metric value.

25 Claims, 11 Drawing Sheets

(51) Int. Cl.
*H04L 27/00* (2006.01)
*H04B 14/00* (2006.01)
(52) U.S. Cl.
CPC .......... *H04L 27/364* (2013.01); *H04L 27/366* (2013.01); *H04B 14/008* (2013.01)

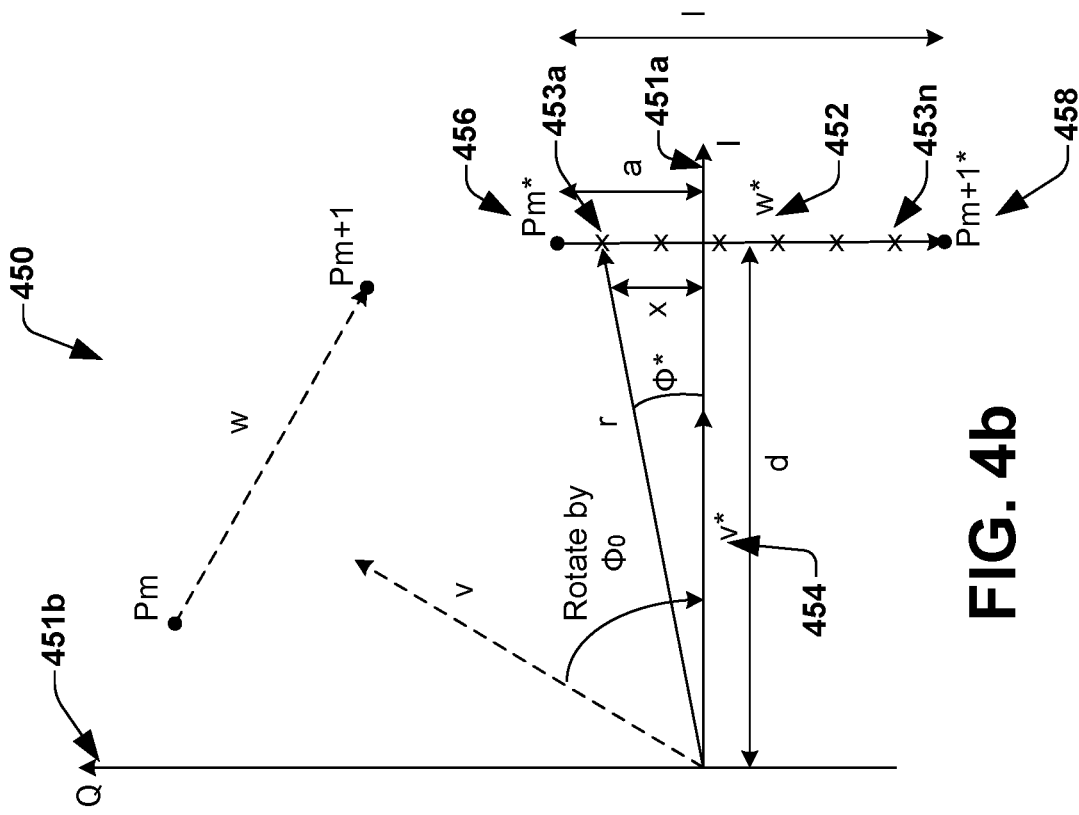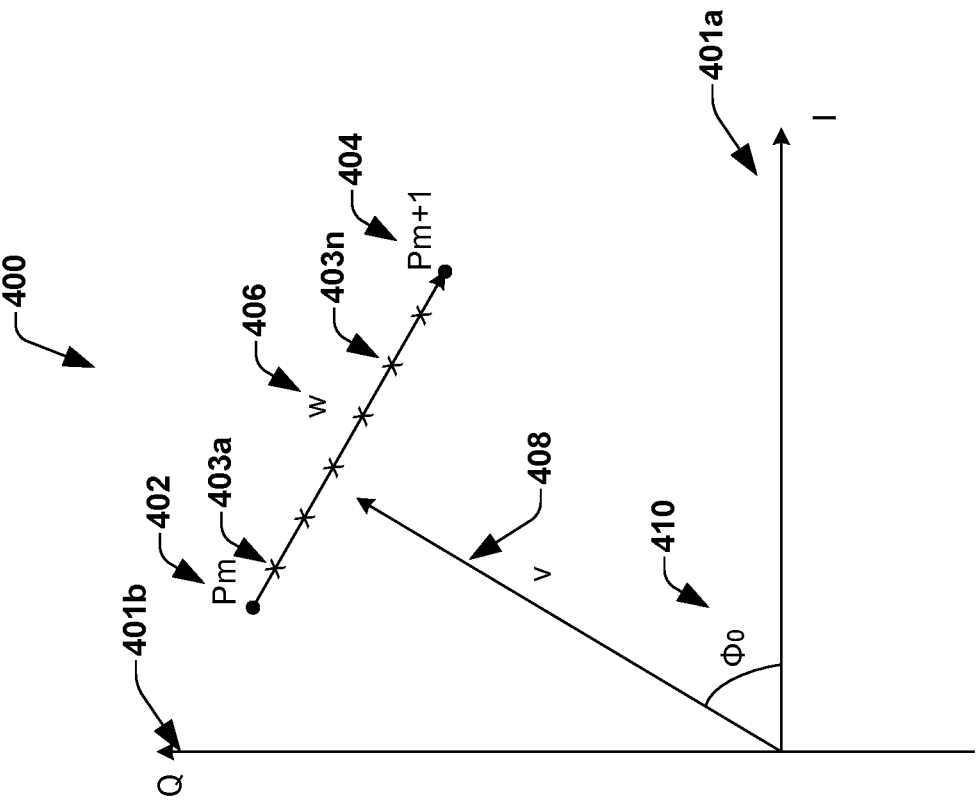
FIG. 4b
FIG. 4a

INTERPOLATION METHOD FOR POLAR SIGNALS IN RADIO FREQUENCY TRANSMITTERS

This application is a National Phase entry application of International Patent Application No. PCT/US2017/024962 filed Mar. 30, 2017 and is hereby incorporated by reference in its entirety.

FIELD

The present disclosure relates to the field of radio frequency (RF) transmitters, and more specifically to an apparatus and a method for interpolation of polar signals in RF transmitters.

BACKGROUND

RF transmitters utilize RF modulators that modulate an input signal onto a carrier wave, in order to generate a transmit (Tx) signal at a desired transmit frequency. In digital RF transmitters, input sampling rates to the RF modulator must match an oscillator frequency associated with the modulator. In addition, the spectral replica of a baseband signal must be suppressed so that certain spectral requirements are met. Therefore, in RF transmitters, the input signal is upsampled from a baseband rate to an RF rate associated with the oscillator. In particular, in the case of polar transmitters, the input signal is upsampled and converted to polar domain, thereby generating upsampled polar samples at RF rate, prior to providing the upsampled polar samples to a polar modulator.

BRIEF DESCRIPTION OF THE DRAWINGS

Some examples of circuits, apparatuses and/or methods will be described in the following by way of example only. In this context, reference will be made to the accompanying Figures.

FIG. 4*a* and FIG. 4*b* illustrate the principle of operation that facilitates the generation of interpolated polar signals in polar transmitters corresponding to a linear IQ interpolation hereinafter referred to as a mapped linear interpolation, according to one embodiment of the disclosure.

DETAILED DESCRIPTION

Figure 1:
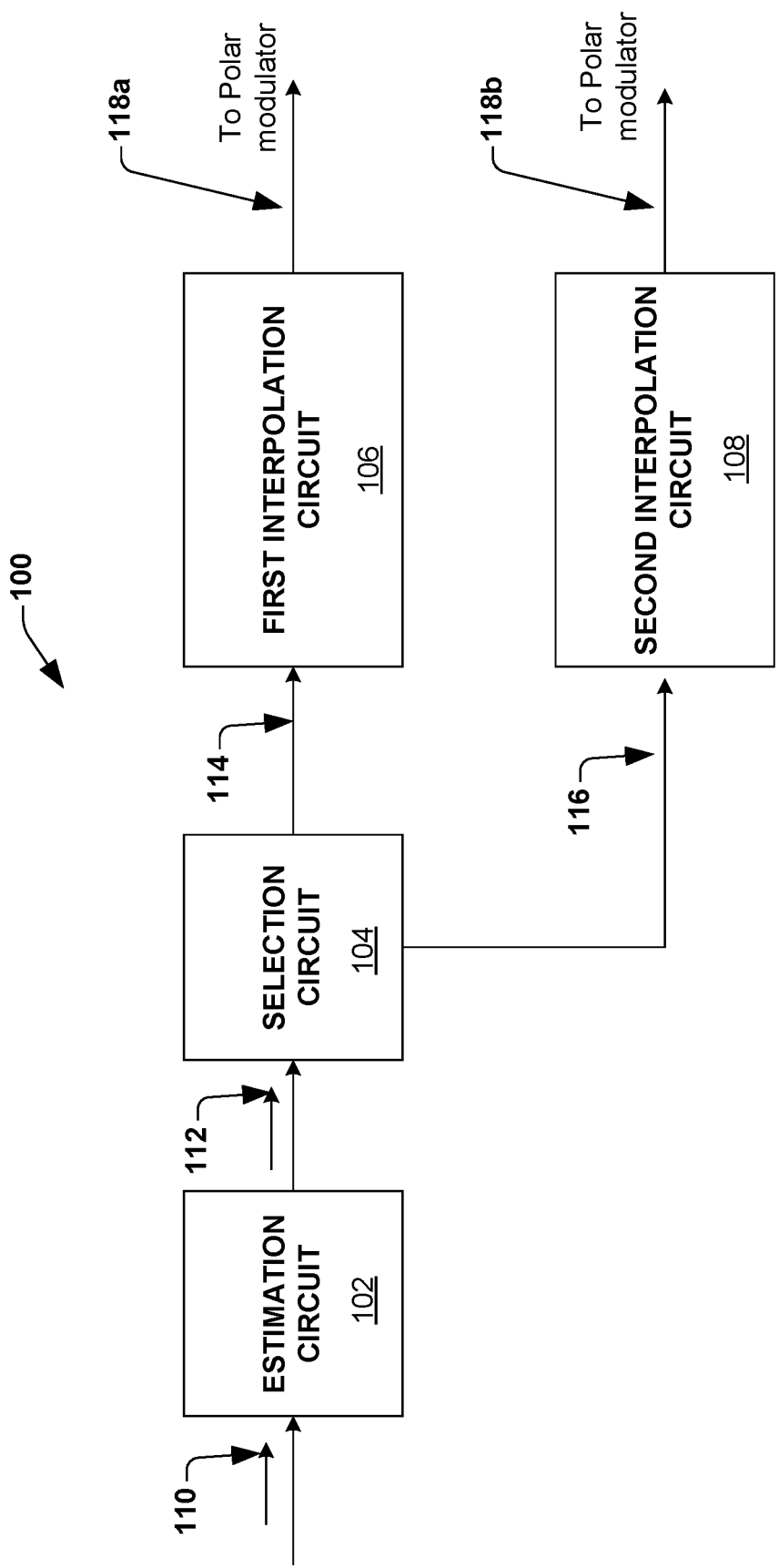
FIG. 1 illustrates a simplified block diagram of a polar transmitter, according to one embodiment of the disclosure.

In one embodiment of the disclosure, an apparatus for interpolation of polar signals in RF transmitters is disclosed. The apparatus comprises an estimation circuit configured to receive an input in-phase (I) quadrature (Q) signal comprising a plurality of input IQ samples having a first sampling rate associated therewith; and determine a selection metric value associated with a predetermined selection metric, wherein the selection metric value is indicative of a position of an IQ trajectory associated with one or more input IQ samples of the input IQ signal with respect to the origin of an IQ plane. The apparatus further comprises a selection circuit coupled to the estimation circuit, and configured to receive the input IQ signal and the selection metric value; and adaptively provide the input IQ signal to a first interpolation circuit that implements a first interpolation method or to a second interpolation circuit that implements a second, different interpolation method for generating interpolated polar samples at a second, different sampling rate, from the input IQ signal, based on the selection metric value.

In one embodiment of the disclosure, a lookup table (LUT) based interpolator circuit is disclosed. The LUT interpolator circuit comprises a LUT circuit comprising an LUT configured to store a plurality of normalized phase angles or a plurality of normalized radius values or both, wherein each of the normalized phase angle and normalized radius value has a respective LUT index value associated therewith. The LUT interpolator circuit further comprises an address generating circuit configured to receive an input IQ signal comprising a plurality of input IQ samples at a first sampling rate; and generate a set of LUT index values at a second sampling rate, in order to access a set of normalized phase angles or a set of normalized radius values or both corresponding to the set of LUT index values from the LUT, wherein the set of LUT index values is generated based on the received input IQ signal and an information of a required interpolation ratio.

In one embodiment of the disclosure, an apparatus for the generation of interpolated polar signals in RF transmitters in polar domain corresponding to a linear interpolation in the IQ domain termed mapped linear interpolation is disclosed. The apparatus comprises a displacement calculation circuit configured to receive an input IQ signal comprising a plurality of input IQ samples at a first sampling rate; and determine a set of normalized displacement values associated with a normalized displacement, based on the received input IQ signal and an information of a required interpolation ratio. The apparatus further comprises an output generation circuit configured to generate a set of interpolated polar samples at a second, different sampling rate based on a mapping between the set of the normalized displacement values, and one or more predefined functions of the normalized displacement indicative of phase angle values or radius values or both of the interpolated polar samples associated with the input IQ signal.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, modulation data or input signal is upsampled from the baseband rate to match the RF clock rate associated with an RF oscillator, in digital RF transmitters. In particular, in polar transmitters, the input signal (e.g., an IQ signal) at the baseband sampling rate is upsampled and converted to polar domain, thereby generating upsampled polar samples at RF sampling rate, prior to providing the upsampled polar samples to the polar modulator. In the following embodiments, the upsampled polar signals wherever used, are deemed to have an RF sampling rate. In typical implementation of digital transmitters, the baseband clock rate associated with the baseband processor is lower than the RF clock rate associated with the polar modulator and therefore, an arbitrary sampling rate converter (ASRC) is utilized in a transmit chain of the polar transmitters, in order to generate the upsampled polar samples that match the RF clock rate. In current implementations of the polar transmitters, several interpolation methods are utilized to generate the upsampled polar samples. For example, in a one interpolation method, an input IQ signal is upsampled and interpolated at a lower clock rate (e.g. the baseband clock rate) to generate upsampled IQ samples at RF sampling rate and the upsampled IQ samples are then converted to polar domain at a higher clock rate (e.g., the RF rate) to generate the upsampled polar samples. In some embodiments, performing the IQ-to-polar conversion at the higher clock rate is computationally expensive and is therefore not preferred.

Further, in another interpolation method, the IQ-to-polar conversion comprising converting the IQ signal to polar signal is performed at the lower clock rate, followed by the upsampling of the polar signal to generate the upsampled polar samples, at the higher clock rate. Even though the second interpolation method is not computationally expensive, in some embodiments, high frequency spectral components occur in polar signals, when an IQ trajectory associated with the IQ signal passes close to the origin of an IQ plane. Therefore, the second interpolation method can only be utilized when the IQ trajectory associated with the IQ signal passes at a particular distance from the origin of the IQ plane, as otherwise, undue signal distortion occurs. Furthermore, in a yet another interpolation method, the IQ-to-Polar conversion comprising converting the IQ signal to polar signal is performed at the lower clock rate, followed by the upsampling of the polar signal to generate the upsampled polar samples, at the higher clock rate, similar to the second interpolation method. Further, a lower radius constraint is utilized in the third interpolation method, that adds a low pass pulse to the IQ trajectory, in order to divert the IQ trajectory away from the origin, when the IQ trajectory is closer to the origin. However, the lower radius constraint modifies the actual transmit signal, thereby increasing error vector magnitude (EVM).

In order to overcome the disadvantages of the above interpolation methods, an apparatus and a method for interpolating polar signals in RF transmitters is proposed in this disclosure. In some embodiments, the method proposed herein adaptively chooses an interpolation method for interpolating the polar signals, based on an information associated with a position of an IQ trajectory associated with one or more input IQ samples associated with the input IQ signal from the origin of an IQ plane. In particular, in one embodiment, the method proposed herein adaptively chooses an interpolation method for generating interpolated (and/or upsampled) polar samples from the input IQ signal, from a first interpolation method comprising a polar interpolation method and a second, different interpolation method comprising a mapped linear interpolation method, based on a selection metric value. In some embodiments, the selection metric value is indicative of the position of the IQ trajectory associated with one or more input IQ samples of the input IQ signal with respect to the origin of the IQ plane. In some embodiments, the selection metric value comprises an estimate of a distance of the IQ trajectory associated with the input IQ signal from the origin of the IQ plane. Further, in another embodiment, an apparatus and a method for implementing the mapped linear interpolation method is also proposed.

Figure 3:
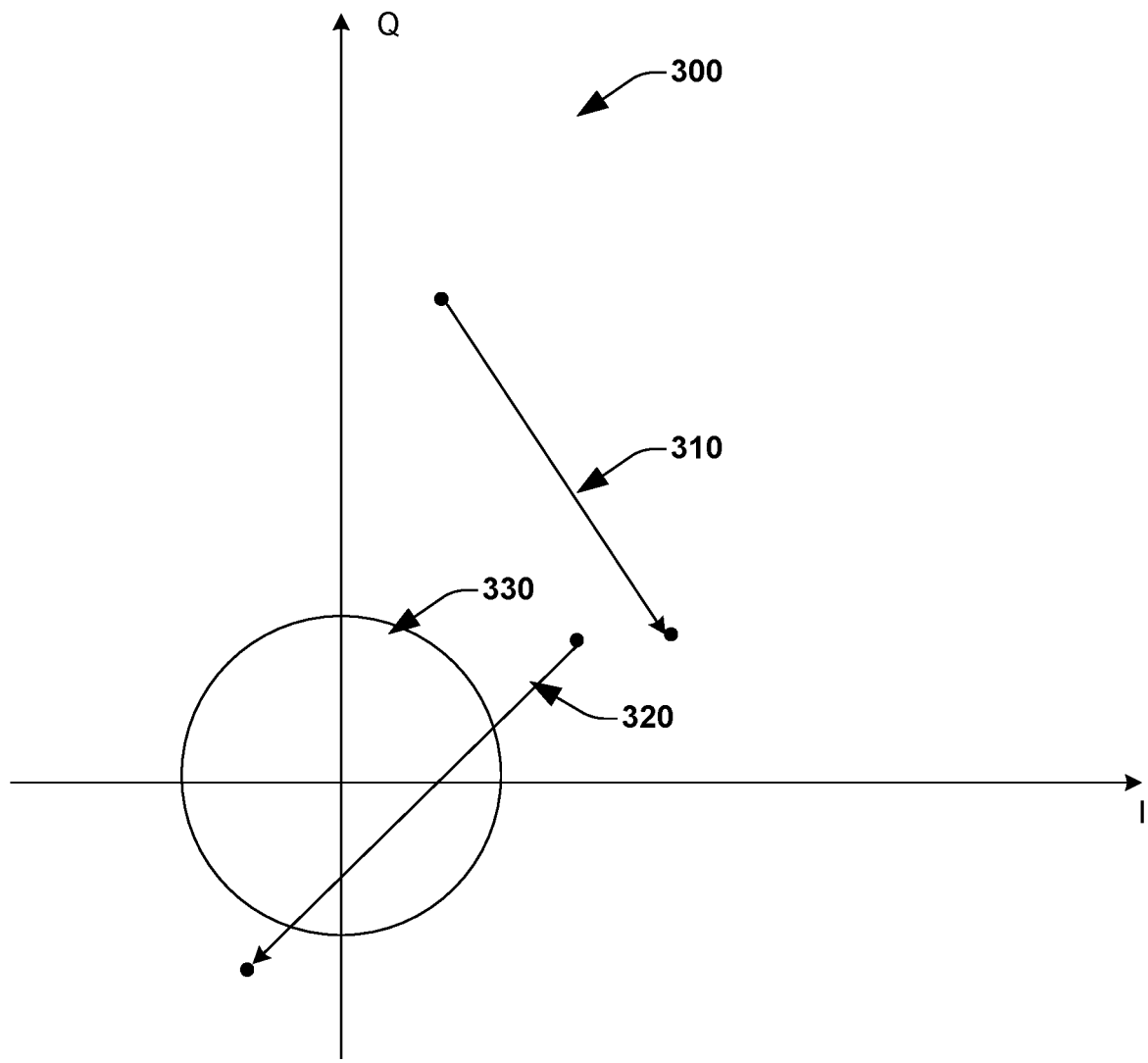
FIG. 3 illustrates a graphical representation of IQ trajectories associated with an IQ signal in an IQ plane, according to one embodiment of the disclosure.

FIG. 1 illustrates a simplified block diagram of a polar transmitter 100, according to one embodiment of the disclosure. The polar transmitter 100 comprises an estimation circuit 102, a selection circuit 104, a first interpolation circuit 106 and a second interpolation circuit 108. In some embodiments, the estimation circuit 102 is configured to receive an input IQ signal 110 comprising a plurality of input IQ samples at a first sampling rate. In some embodiments, the first sampling rate can comprise a baseband rate. Alternately, in other embodiments, the first sampling rate can comprise a higher sampling rate than the baseband rate. The input IQ signal 110 comprises an I component and a Q component associated therewith. However, the I component and the Q component associated with the input IQ signal is not shown here for ease of reference. In some embodiments, the estimation circuit 102 is further configured to determine a selection metric value associated with a predetermined selection metric, based on the received input IQ signal 110. In some embodiments, the selection metric value is indicative of a position of an IQ trajectory (e.g., the IQ trajectories 310 and 320 in FIG. 3) associated with one or more input IQ samples of the input IQ signal 110 from the origin of an IQ plane. In some embodiments, the estimation circuit 102 is configured to determine the selection metric value for each successive IQ trajectory associated with the input IQ signal 110. In some embodiments, the position of an IQ trajectory can comprise a distance of the IQ trajectory and/or a shape (e.g., a curvature) of the IQ trajectory. In some embodiments, the predetermined selection metric can comprise an IQ radius comprising a distance (r) of an IQ trajectory associated with one or more input IQ samples of the input IQ signal 110 from the origin of an IQ plane. And, in such embodiments, the selection metric value can comprise an IQ radius estimate (i.e., an IQ radius value). However, in other embodiments, the predetermined selection metric can comprise more advanced criteria like r/r", taking into account a curvature of the IQ trajectory (r"). Further, other predetermined selection metrics are also contemplated to be within the scope of this disclosure.

The selection circuit 104 is coupled to the estimation circuit 102 and is configured to receive the selection metric value and the input IQ signal 110 from the estimation circuit 102. Therefore, in such embodiments, an output signal 112 of the estimation circuit comprises the input IQ signal 110 and the selection metric value. Upon receiving the selection metric value, in some embodiments, the selection circuit 104 is configured to process the selection metric value and estimate a position of the IQ trajectory associated with one or more input IQ samples, based on the selection metric value. In some embodiments, the position of the IQ trajectory is estimated based on a first criteria comprising, determining if the selection metric value is within a first predetermined metric range or a second, different predetermined metric range. In some embodiments, the first predetermined metric range can include a range of values between a predetermined metric threshold and a predetermined value (e.g., zero or any other value) lower than the predetermined metric threshold. Similarly, the second predetermined metric range can include a range of values between the predetermined metric threshold and a predetermined value (e.g., any value) higher than the predetermined metric threshold. However, in other embodiments, the first predetermined metric range can include a range of values between the predetermined metric threshold and a predetermined value (e.g., any value) higher than the predetermined metric threshold. And, the second predetermined metric range can include a range of values between the predetermined metric threshold and a predetermined value (e.g., zero or any other value) lower than the predetermined metric threshold. For example, in some embodiments, when the selection metric value comprises an IQ radius estimate, a selection metric value within the first predetermined metric range can indicate that the IQ trajectory is closer to the origin, and a selection metric value within the second predetermined metric range can indicate that the IQ trajectory is farther away from the origin. Further in some embodiments, the position of the IQ trajectory is estimated based on a second criteria comprising, comparing the selection metric value to a predetermined metric threshold (e.g., the radius threshold 330 in FIG. 3). In some embodiments, when the selection metric value comprises an IQ radius estimate, the predetermined metric threshold provides an indication if an IQ trajectory is close to the origin or farther away from the origin.

For example, a selection metric value less than the predetermined metric threshold indicates that the IQ trajectory is closer to the origin, and a selection metric value greater than the predetermined metric threshold indicates that the IQ trajectory is farther away from the origin. Furthermore, in other embodiments, other different criteria for estimating the position of the IQ trajectory associated with one or more input IQ samples based on the selection metric value is also contemplated to be within the scope of this disclosure. In some embodiments, the selection circuit 104 is further configured to adaptively convey the input IQ signal 110 to the first interpolation circuit 106 or to the second interpolation circuit 108, based on the selection metric value. For example, in some embodiments, the selection circuit 104 can be configured to convey the input IQ signal 110 to the first interpolation circuit 106, when the selection metric value indicates that the IQ trajectory is closer to the origin and convey the input IQ signal 110 to the second interpolation circuit 108, when the selection metric value indicates that the IQ trajectory is farther away from the origin. However, in other embodiments, the selection circuit 104 can be configured to convey the input IQ signal 110 to the first interpolation circuit 106 or to the second interpolation circuit 108, based on a different criterion associated with the selection metric value.

In some embodiments, the first interpolator circuit 106 is coupled to the selection circuit 104 and is configured to receive the input IQ signal 110 and implement a first interpolation method for generating interpolated polar samples 118a from the input IQ signal 110. In some embodiments, the second interpolator circuit 108 is coupled to the selection circuit 104 and is configured to receive the input IQ signal 110 and implement a second, different interpolation method for generating interpolated polar samples 118b from the input IQ signal 110. In some embodiments, the interpolated polar samples 118a and 118b are at a second, different sampling rate (e.g., a RF rate) higher than the first sampling rate. In some embodiments, the interpolated polar samples 118a and 118b are provided to a polar modulator. At one instance, either the interpolated polar samples 118a or the interpolated polar samples 118b are generated, based on the interpolation circuit chosen, in accordance with the selection metric value. In some embodiments, the selection circuit 104 enables to adaptively choose between the first interpolation method and the second, different interpolation method for generating the interpolated polar samples (e.g., 118a or 118b) from the input IQ signal 110, based on the selection metric value.

Figure 2:
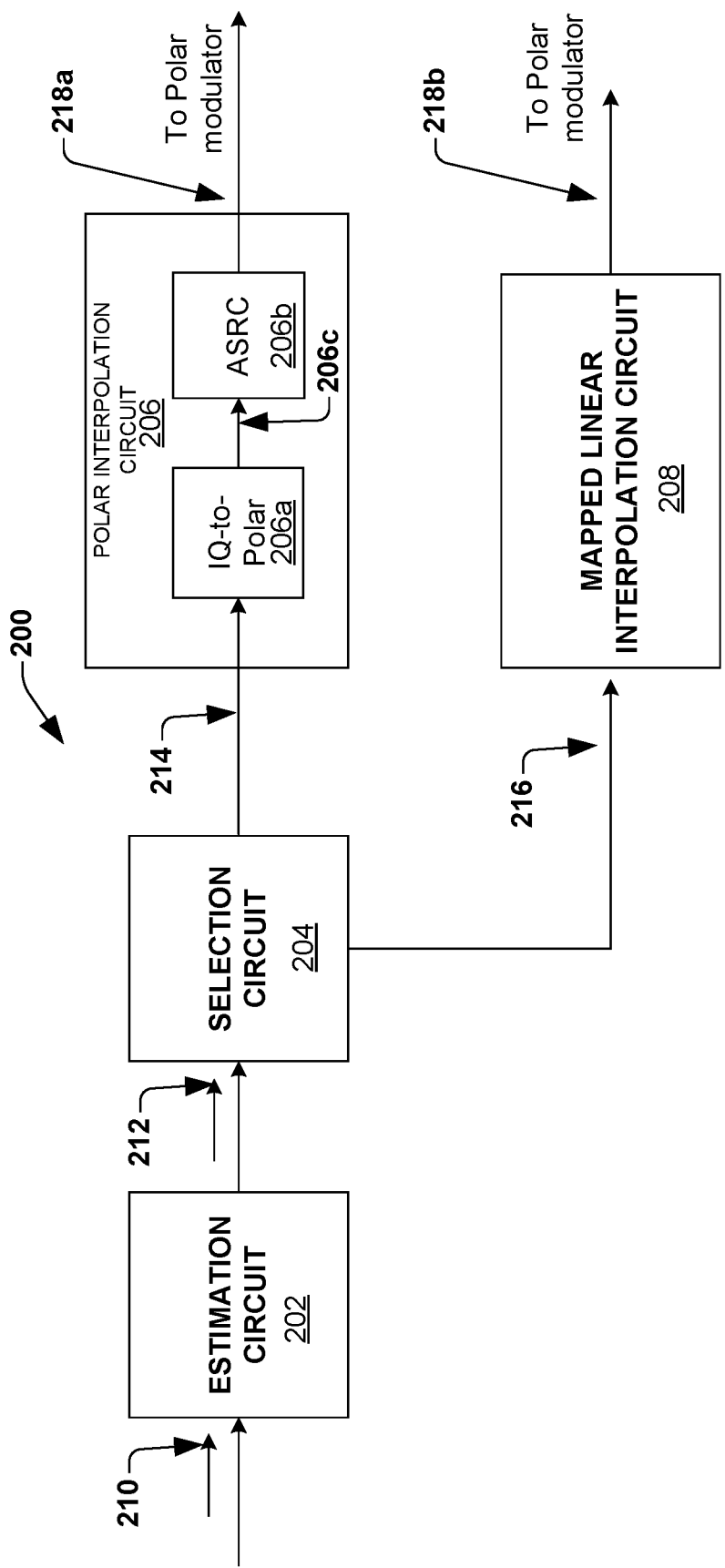
FIG. 2 illustrates an example implementation of a polar transmitter, according to one embodiment of the disclosure.

FIG. 2 illustrates an example implementation of a polar transmitter 200, according to one embodiment of the disclosure. In some embodiments, the polar transmitter 200 depicts one possible way of implementation of the polar transmitter 100 in FIG. 1. In this embodiment, the polar transmitter 200 is similar to the polar transmitter 100 in FIG. 1, with the first interpolation circuit 106 implemented as a polar interpolation circuit and the second interpolation circuit 108 implemented as a mapped linear interpolation circuit. Alternately in other embodiments, the first interpolation circuit 106 of the polar transmitter 100 can be implemented as a mapped linear interpolation circuit and the second interpolation circuit 108 of the polar transmitter 100 can be implemented as a polar interpolation circuit. The polar transmitter 200 comprises an estimation circuit 202, a selection circuit 204, a polar interpolation circuit 206 and a mapped linear interpolation circuit 208.

In some embodiments, the estimation circuit 202 is configured to receive an input IQ signal 210 comprising a plurality of input IQ samples at a first sampling rate. In some embodiments, the first sampling rate can comprise a baseband rate. Alternately, in other embodiments, the input IQ signal 210 is an already upsampled signal and therefore, in such embodiments, the first sampling rate can comprise a higher sampling rate than the baseband rate. In some embodiments, the estimation circuit 202 is further configured to determine a selection metric value associated with a predetermined selection metric, based on the received input IQ signal 210, as explained above with respect to FIG. 1. In some embodiments, the selection metric value is indicative of a position of an IQ trajectory (e.g. the IQ trajectories 310 and 320 in FIG. 3) associated with one or more input IQ samples of the input IQ signal 210 from the origin of an IQ plane. In some embodiments, the position of an IQ trajectory can comprise a distance of the IQ trajectory and/or a shape (e.g., a curvature) of the IQ trajectory. In other embodiments, the position of an IQ trajectory can further comprise other location specific characteristics associated with the IQ trajectory.

The selection circuit 204 is coupled to the estimation circuit 202 and is configured to receive the selection metric value and the input IQ signal 210 from the estimation circuit 202. Therefore, in such embodiments, an output signal 212 of the estimation circuit 202 comprises the input IQ signal 210 and the selection metric value. Upon receiving the selection metric value, in some embodiments, the selection circuit 204 is configured to process the selection metric value and estimate a position of the IQ trajectory associated with one or more input IQ samples (e.g., determine if the IQ trajectory is closer to the origin or farther away from the origin, in some embodiments), based on the selection metric value, as explained above with respect to FIG. 1. The selection circuit 204 is further configured to adaptively provide the input IQ signal 210 to the polar interpolator circuit 206 or to the linear interpolator circuit 208, based on the selection metric value. For example, in some embodiments, when the selection metric value comprises an IQ radius estimate, and when the IQ radius estimate indicates that the IQ trajectory associated with the input IQ signal 210 is farther away from the origin (e.g., IQ trajectory 310 in FIG. 3), the selection circuit 204 is configured to provide the input IQ signal 210 to the polar interpolation circuit 206 over the selection output path 214. Similarly, when the selection metric value comprises an IQ radius estimate, and when the IQ radius estimate indicates that the IQ trajectory associated with the input IQ signal 210 is closer to the origin (e.g., the IQ trajectory 320 in FIG. 3), the selection circuit 204 is configured to provide the input IQ signal 210 to the mapped linear interpolation circuit 208 over the selection output path 216.

However, in other embodiments, the selection metric can comprise more advanced selection criteria that takes into account other characteristics associated with the IQ trajectory, for example, a magnitude of r/r″, taking into account a curvature of the IQ trajectory (r″) apart from the IQ radius r. In such embodiments, both the IQ radius estimate and the curvature of the IQ trajectory have to be taken into account, before adaptively providing the input IQ signal 210 to the polar interpolator circuit 206 or to the mapped linear interpolator circuit 208. In some embodiments, the position of the IQ trajectory is estimated based on a first criteria comprising, determining if the selection metric value is within a first predetermined metric range or a second, different predetermined metric range. In some embodiments, the first metric range and the second, different metric range are predetermined, based on the selection metric chosen. Further in some embodiments, the position of the IQ trajectory is estimated based on a second criteria comprising, comparing the selection metric value to a predetermined metric threshold. In some embodiments, the metric threshold is predetermined, based on the selection metric chosen.

The polar interpolation circuit 206 is coupled to the selection circuit 204 and is configured to upsample and interpolate the input IQ signal 210, based on a polar interpolation method. In such embodiments, the polar interpolation circuit 206 is configured to receive the input IQ signal 210 and generate interpolated and upsampled polar samples 218a at a second, different sampling rate (e.g., a radio frequency (RF) rate) from the input IQ signal 210. In some embodiments, the sampling rate of the interpolated polar samples 218a is higher than the sampling rate of the input IQ signal 210. In some embodiments, the interpolated polar samples 218a are further provided to a polar modulator (not shown) for further processing. In some embodiments, the polar interpolation circuit 206 comprises an IQ-to-polar conversion circuit 206a (e.g., CORDIC) that operates at a low clock rate (e.g., the baseband rate) and convert the IQ samples at a low sampling rate associated with the input IQ signal 210 into corresponding polar samples at the low sampling rate (e.g., the baseband rate), thereby forming low rate polar samples 206c. In some embodiments, the polar interpolation circuit 206 further comprises an arbitrary sampling rate converter (ASRC) 206b configured to convert the low rate polar samples 206c to interpolated polar samples 218a at the RF rate. In some embodiments, the ASRC 206b operated at a high clock rate (e.g., the RF rate). In some embodiments, the ASRC 206b uses a conventional low pass interpolation algorithm to generate the interpolated polar samples 218a. However, other conventional polar interpolation algorithms are also contemplated to be within the scope of this disclosure. In some embodiments, the ASRC 206b performs the upsampling of the polar signals 206c at the low rate by variable fractional factors, in order to generate the interpolated polar samples 218a. In some embodiments, the RF rate corresponds to an oscillator frequency associated with the polar modulator and is typically higher than the baseband rate. In some embodiments, the input IQ signal 210 is upsampled in order to match the RF rate of the polar modulator.

The mapped linear interpolation circuit 208 is coupled to the selection circuit 204 and is configured to upsample and interpolate the input IQ signal 210, based on mapped linear interpolation. In such embodiments, the mapped linear interpolation circuit 208 is configured to receive the input IQ signal 210 at the lower sampling rate and generate interpolated and upsampled polar samples 218b at the higher sampling rate (e.g., the radio frequency (RF) rate) directly from the input IQ signal 210, based on the mapped linear interpolation. In some embodiments, the interpolated polar samples 218b are further provided to a polar modulator (not shown) for further processing. In some embodiments, the mapped linear interpolation circuit 208 is configured to generate the interpolated polar samples 218b at the higher sampling rate from the input IQ signal 210, based on mapped linear interpolation of the input IQ signal 210 based on one or more predefined functions indicative of polar representation of IQ samples. In some embodiments, the mapped linear interpolation of the input IQ signal 210 is realized based on a normalization of IQ trajectories associated with the input IQ signal 210, further details of which are provided in an embodiment below.

In some embodiments, the mapped linear interpolation circuit 208 enables to generate the interpolated polar samples 218b from the input IQ signal 210 in an efficient way when the IQ trajectory associated with the input IQ signal 210 is closer to the origin. When the IQ trajectory associated with the input IQ signal 210 is closer to the origin, high frequency spectral components occur in polar signals which leads to undue signal distortion while utilizing the polar interpolation method for interpolating the input IQ signal 210. However, as indicated above, other criteria associated with the IQ trajectory, for example, a curvature associated with the IQ trajectory is also taken into consideration, in some embodiments, before choosing an interpolation method for generating the interpolated polar samples. That is, even if the IQ trajectory is close to the origin, other factors like the curvature of the IQ trajectory is also considered before choosing the interpolation method, in some embodiments.

FIG. 4a and FIG. 4b illustrate the principle of operation that facilitates to utilize mapped linear interpolation for generating interpolated and upsampled polar signals in polar transmitters, according to one embodiment of the disclosure. In some embodiments, the principle of operation explained herein is utilized within the mapped linear interpolation circuit 208 in FIG. 2. However, in other embodiments, the principle of operation explained herein can be applied to any interpolation circuit that utilizes mapped linear interpolation. In this embodiment, the principle of operation is explained with reference to the mapped linear interpolation circuit 208 in FIG. 2. FIG. 4a illustrates an IQ plane 400 comprising an I axis 401a and a Q-axis 401b. Let $P_m$ 402 and $P_{m+1}$ 404 represent two IQ data points associated with an input IQ signal (e.g., the input IQ signal 210 in FIG. 2), that needs to be converted to interpolated polar samples (e.g., the interpolated polar samples 218b in FIG. 2), where m corresponds to a current time index at low sampling rate. Further, vector w 406 represents a vector connecting the IQ data points $P_m$ 402 and $P_{m+1}$ 404, that forms the IQ trajectory 406, and vector v 408 represents a normal vector to the IQ trajectory 406 having an angle $\phi_0$ 410 associated therewith.

The goal of the mapped linear interpolation circuit (e.g., the mapped linear interpolation circuit 208 in FIG. 2) is to generate upsampled polar samples at higher rate (corresponding to the sampling points 403a, 403n etc. on the vector w 406) in polar domain, from the input IQ signal (e.g., the input IQ signal 210 in FIG. 2) based on mapped linear interpolation. In order to achieve this, the IQ trajectory 406 needs to be normalized. FIG. 4b illustrates an IQ plane 450 comprising an I axis 451a and a Q-axis 451b. In some embodiments, the IQ plane 450 is the same as the IQ plane 400 in FIG. 4a and is utilized herein to illustrate the effect of normalization of the IQ trajectory 406 in FIG. 4a. FIG. 4b illustrates a normalized IQ trajectory w* 452, formed based on normalizing the IQ trajectory 406 in FIG. 4a. In some embodiments, the normalized IQ trajectory w* 452 is obtained based on rotating the normal vector v 408 by an angle $\phi_0$, onto the l-axis, thereby forming the vector v* 454 in FIG. 4b. Therefore, in such embodiments, the IQ data points $P_m$ 402 and $P_{m+1}$ 404 in FIG. 4a are also rotated by the same angle to form the IQ data points $P_m$* 456 and $P_{m+1}$* 458. In this embodiment, the IQ trajectory 406 is normalized based on rotating the normal vector v 408 by an angle $\phi_0$, onto the l-axis. However, in other embodiments, the IQ trajectory 406 can be normalized based on rotating the normal vector v 408 by an angle $\phi_0$, onto the Q-axis. From the normalized IQ trajectory w* 452, one can obtain the following IQ trajectory parameters of the IQ trajectory w 406, that is, an IQ distance d comprising a distance of w 406 from the origin, IQ trajectory length l comprising a length of w 406, an IQ offset a comprising an offset of w 406 and a rotation angle $\phi_0$ comprising an angle of vector v 408. In some embodiments, the IQ trajectory parameters are generated by utilizing a coordinate rotation digital computer (CORDIC).

The key idea utilized herein that enables to utilize mapped linear interpolation to generate the interpolated polar samples (e.g., the interpolated polar samples 218b in FIG. 2), is that, when a linear connection of two IQ samples (e.g., the IQ trajectory 406 in FIG. 4a) associated with an input IQ signal is normalized to form an angle and distance normalized IQ trajectory (e.g., the angle normalized IQ trajectory w* 452 can be seen in FIG. 4b), a normalized polar representation of the high rate sampling points can be drawn from predefined constant functions. Therefore, the phase angles and radius values (i.e., the polar representation) for the sampling points (e.g., the sampling points 403a, 403n etc. on the vector w 406) for an IQ trajectory (e.g., the IQ trajectory 406 in FIG. 4a) can be obtained based on the normalized polar representation of the sampling points of the normalized IQ trajectory, in accordance with the predefined constant functions.

For example, from the normalized IQ trajectory w* 452 in FIG. 4b, for any sampling point (e.g., the sampling point 453a) at a displacement of x from the l-axis 451a, the phase values V along the normalized IQ trajectory w* 452 based on linear IQ interpolation, can be defined as given below:

$$\Phi^* = -\arctan\left(\frac{x}{d}\right) \quad (1)$$

Where $\phi$* is defined herein as a normalized phase angle, x is the displacement of the sampling points on the vector w* 452 from the l-axis 451a and d is the distance of w* 452 from the origin.

Therefore, a phase φ along the original vector, that is the IQ trajectory w 406 is given by:

$$\phi = \phi_0 + \phi^* \quad (2)$$

Substituting $x/d=\xi$, a normalized displacement  (3)

The phase φ can be written as, $$\phi = f(\xi) = \phi_0 - \arctan(\xi) \quad (4)$$

thus, from equation (4), it can be seen that the phase angle φ for any IQ sampling point along an IQ trajectory (e.g., the IQ trajectory 406 in FIG. 4*a*) can be derived from a rotation angle $\phi_0$ obtained from the rotation of a normal vector (e.g., the normal vector v 408 in FIG. 4*a*) and a function of ξ, for example, arctan(ξ).

Similarly, from FIG. 4*b*, radius values r for any sampling point (e.g., the sampling point 453*a*) at a displacement of x from the l-axis 451*a* along the normalized IQ trajectory 452 based on liner IQ interpolation, can be defined as given below:

$$r = \sqrt{d^2 + x^2} = d\sqrt{1 + \frac{x^2}{d^2}} \quad (5)$$

Where x is the displacement of the sampling points on the vector w* 452 from the l-axis 451*a* and d is the distance of w* 452 from the origin. In some embodiments, the radius values r for the sampling points along the normalized IQ trajectory w* 452 in FIG. 4*b* is same as the radius values for the sampling points along the IQ trajectory w 406 in FIG. 4*a*. Further, in some embodiments, the radius values r can also be defined in terms of the normalized displacement as given below:

$$r = f(\xi) = d\sqrt{1+\xi^2} = d \cdot r^* \quad (6)$$

where r* is defined herein as a normalized radius value. Thus, from equation (6), it can be seen that the radius value r for any IQ sampling point along an IQ trajectory (e.g., the IQ trajectory 406 in FIG. 4*a*) can be derived based on the distance d of w* 452 from the origin and a function of ξ, for example, $r^* = \sqrt{1+\xi^2}$.

Therefore, from above, it can be seen that the phase angles φ of the sampling points of the IQ trajectory (e.g., the IQ trajectory 406 in FIG. 4*a*) for any IQ signal can be derived from an information of the rotation angle $\phi_0$ and the normalized displacement ξ, based on equation (4). Similarly, it can be seen that the radius value r of the sampling points of the IQ trajectory (e.g., the IQ trajectory 406 in FIG. 4*a*) for any IQ signal can be derived from an information of the distance d and the normalized displacement ξ, based on equation (6). In some embodiments, the rotation angle $\phi_0$ and the distance d for an input IQ signal (e.g., the input IQ signal 210) can be derived based on a normalization of the IQ trajectory (e.g., the IQ trajectory 406 in FIG. 4*b*) associated with the input IQ signal. Further, the normalized displacement corresponding to each sampling point (e.g., the sampling points 403*a*, 403*n* etc. on the IQ trajectory 406 in FIG. 4*a*) on the IQ trajectory (e.g., the IQ trajectory 406 in FIG. 4*b*) is to be determined, the details of which are given in FIG. 5 below. In some embodiments, the normalized displacement ξ can be determined based on an information of a location of the sampling points (x value) along the angle normalized IQ trajectory (e.g., the angle normalized IQ trajectory w* 452 in FIG. 4*b*). Therefore, in order to generate upsampled polar samples (e.g., the interpolated polar samples 218*b* in FIG. 2) from an input IQ signal (e.g., the input IQ signal 210 in FIG. 2), a mapped linear interpolator circuit (e.g., the mapped linear interpolator circuit 208 in FIG. 2) can be configured to normalize an IQ trajectory associated with the input IQ signal, determine a normalized displacement ξ corresponding to each sampling point on the IQ trajectory, and determine the corresponding phase angle and radius values (i.e., the interpolated polar samples) based on equations (4) and (6) above, respectively. In some embodiments, the mapped linear interpolator circuit is configured to normalize a plurality of IQ trajectories associated with the input IQ signal, in order to generate interpolated polar samples corresponding to a respective IQ trajectory of the plurality of IQ trajectories.

Figure 5:
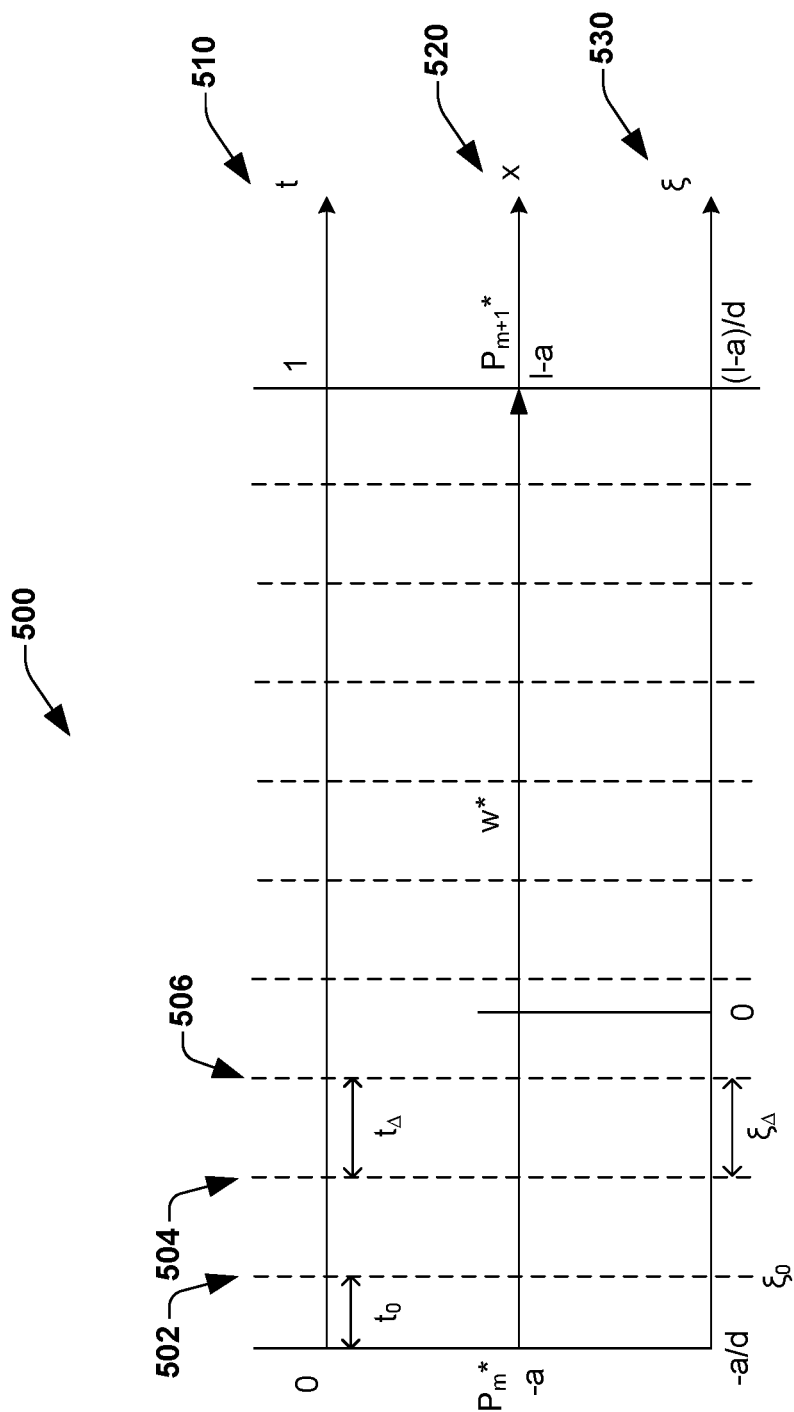
FIG. 5 depicts a graph illustrating a correlation between sampling time offsets $t_k$ of sampling points on a normalized IQ trajectory associated with an input IQ signal and the corresponding normalized displacement $\xi$.

FIG. 5 depicts a graph 500 illustrating a correlation between sampling time offsets $t_k$ of sampling points (corresponding to RF output samples 502, 504, 506 etc.) on an angle normalized IQ trajectory associated with an input IQ signal and the corresponding normalized displacement ξ. A time offset t=0 (axis 510 in FIG. 5) corresponds to the time of the first IQ sample $P_m$ of the IQ trajectory section $P_m$ to $P_{m+1}$ and a time offset t=1 corresponds to the time of the second IQ sample $P_{m+1}$. The correlation in the graph 500 is derived based on the angle normalized IQ trajectory w* 452 in FIG. 4*b*. In other embodiments, the same correlation can be derived based on angle normalized IQ trajectories of any input IQ signal. In some embodiments, information of a location of the sampling points on the angle normalized IQ trajectory is required in order to determine the normalized displacement corresponding to each sampling point on the angle normalized IQ trajectory. The graph 500 comprises a time offset axis t 510 that depicts the point in time (to) where the first output sample at the RF rate for the angle normalized IQ trajectory w* 452 has to be generated, and the time difference tΔ between the successive RF output samples i.e. the interpolated polar samples. In some embodiments, the time difference $t_\Delta$ between the successive RF output samples may not be constant and depends on an interpolation ratio associated therewith. In order to derive the normalized displacement ξ, the sampling time offsets $t_k$ of the RF output samples have to be mapped to a location of the corresponding RF output samples along the angle normalized IQ trajectory w* 452. A location axis x 520 is therefore depicted herein to illustrate a mapping of the sampling time offsets of the RF output samples to their corresponding location on the angle normalized IQ trajectory w* 452. In some embodiments, the location axis x 520 is further scaled by an inverse of d, as depicted by the correlation axis 530, in order to derive the correlation between the sampling time offsets $t_k$ on the time offset axis t 510 and the corresponding normalized displacement value $\xi_k$.

In some embodiments, normalized displacement corresponding to each sampling points 502, 504, 506 etc. can be derived based on an information of the time offset t0 of a first RF output sample, the time difference tΔ between the successive RF samples and mapping the sampling time offsets to the correlation axis 530 depicted in the graph 500. In order to map the sampling time offsets (i.e., the time offset axis (t)) to the correlation axis ξ 530, in some embodiments, information on the IQ trajectory parameters d, l, a (as explained above with respect to FIG. 4*b*) is also required. In some embodiments, a time offset for the first RF sample to is given by, $$t_{0,m} = _0 = 0 \quad (7)$$

where m is the time index of the low rate input IQ signal, for example, corresponding to the IQ data point $P_m^*$ in FIG. 5.

Further, the time difference to between the successive RF samples is given by, $$t_{\Delta,m} = n^{-1} \quad (8)$$

Where n is the current interpolation ratio. In some embodiments, the interpolation ratio corresponds to a ratio of the sampling rate of the RF output samples (i.e., high clock rate) to the sampling rate of the input IQ samples (i.e., the low clock rate). Here, the interpolation ratio n is considered constant within a low rate period. However, in other embodiments, the interpolation ration n can change from RF sample to RF sample.

From equations (7) and (8), a number of RF output samples Km on the current IQ trajectory w* 452 can be derived as given below:

$$K_m = \left\lceil \frac{1 - t_{0,m}}{t_{\Delta,m}} \right\rceil \quad (9)$$

Similarly, the time offset for the first RF sample corresponding to the subsequent IQ trajectory section between IQ sample points $P_{m+1}^*$ and $P_{m+2}^*$ can be derived as given below:

$$t_{0,m+1} = t_{0,m} + K_m t_{\Delta,m} - 1 \quad (10)$$

The above equation shows the relation between the first RF time offsets of each section $t_{0,m}$ of subsequent IQ trajectory sections.

From the above parameters and from the correlation axis ξ 530, normalized displacement ξ corresponding to the first RF output sample of the IQ trajectory section $P_m$ to $P_{m+1}$ where subsequently the index m is omitted for clarity is derived as:

$$\xi_0 = \frac{1}{d}(t_0 l - a) \quad (11)$$

and
a difference in normalized displacement $\xi_\Delta$ between successive RF samples is derived as:

$$\xi_\Delta = \frac{1}{d}(t_\Delta l) \quad (12)$$

From $\xi_0$ and $\xi_\Delta$, the normalized displacement value $\xi_k$ corresponding to each RF output sample 502, 504, 506 etc. can be derived as given below:

$$\xi_k = \xi_0 + k\xi_\Delta; 0 \leq k < K \quad (13)$$

Where K (i.e. $K_m$ in equation (9)) is the number of RF output samples on the current IQ trajectory.

Once the normalized displacement value $\xi_k$ corresponding to each RF output sample 502, 504, 506 etc. is determined, the corresponding phase angles and radius values for the RF output samples on the original vector w 406 in FIG. 4a can be determined based on equations (4) and (6) above.

In one embodiment, the arctan(ξ) function in equation (4) and the $\sqrt{1+\xi^2}$ function in equation (6) are realized using a lookup table (LUT). In such embodiments, the mapped linear interpolation circuit comprises a LUT comprising a plurality of normalized phase angles arctan(ξ) and a plurality of normalized radius values $\sqrt{1+\xi^2}$, for a plurality of predetermined values of ξ, the details of which are given in an embodiment below. However, in other embodiments, the arctan(ξ) function in equation (4) and the $\sqrt{1+\xi^2}$ function in equation (6) can be realized differently. For example, upon determining the normalized displacement values $\xi_k$ according to equation (13), the arctan(ξ) function and the $\sqrt{1+\xi^2}$ function can be approximated using suitable approximation algorithms. In some embodiments, the equations (7)-(13) for determining the normalized displacement values $\xi_k$ are implemented within a mapped linear interpolation circuit (e.g., the mapped linear interpolation circuit 208 in FIG. 2).

Figure 6:
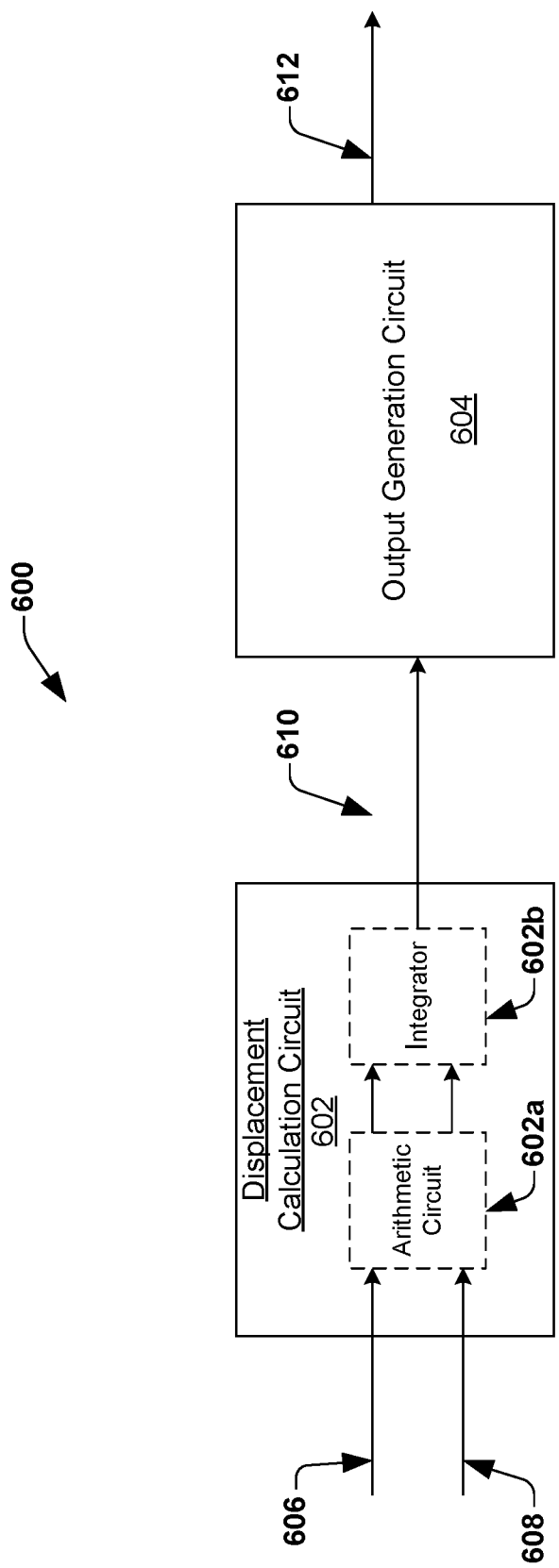
FIG. 6 depicts a simplified block diagram of a mapped linear interpolation circuit, according to one embodiment of the disclosure.

FIG. 6 depicts a simplified block diagram of a mapped linear interpolation circuit 600, according to one embodiment of the disclosure. In some embodiments, the mapped linear interpolation circuit 600 can be included within the mapped linear interpolation circuit 208 in FIG. 2. However, in other embodiments, the mapped linear interpolation circuit 600 can be part of any other polar transmitter, and can be utilized for generating interpolated polar samples at RF rate from an input IQ signal at a lower sampling rate (e.g., baseband rate). In this embodiment, the mapped linear interpolation circuit is explained with respect to the mapped linear interpolation circuit 208 in FIG. 2 and the principle of operation explained in FIG. 4a, FIG. 4b and FIG. 5. The mapped linear interpolation circuit 600 comprises a displacement calculation circuit 602 and an output generation circuit 604. In some embodiments, the displacement calculation circuit 602 is configured to receive an input IQ signal 606 (e.g., the input IQ signal 216 in FIG. 2). In some embodiments, the input IQ signal 606 comprises a plurality of input IQ samples having a first sampling rate (e.g., a baseband rate or a lower sampling rate) associated therewith. In some embodiments, the displacement calculation circuit 602 is further configured to receive a current interpolation ratio 608.

Upon receiving the input IQ signal 606 and the current interpolation ratio 608, in some embodiments, the displacement calculation circuit 602 is configured to normalize the input IQ signal based on rotating the normal vectors of IQ trajectories associated with the input IQ signal 606 on to an l-axis of a respective IQ plane, as shown in FIG. 4b above or to a Q-axis of the respective IQ plane. For each IQ trajectory associated with the input IQ signal 606, the displacement calculation circuit 602 is further configured to determine IQ trajectory parameters comprising an IQ distance d, IQ trajectory length l, an IQ offset a and a rotation angle $\phi_0$, as explained above with respect to FIG. 4a above. In some embodiments, the IQ trajectory parameters can be determined at the displacement calculation circuit 602 by using a coordinate rotation digital computer (CORDIC). Upon determining the IQ trajectory parameters, the displacement calculation circuit 602 is configured to determine a plurality of normalized displacement values $\xi_k$ based on implementing the equations (7)-(13) above. In some embodiments, the displacement calculation circuit 602 can comprise an arithmetic circuit 602a configured to determine the IQ distance d, the IQ trajectory length l, the IQ offset a and the rotation angle $\phi_0$. In some embodiments, the arithmetic circuit 602a can be further configured to implement the equations (7)-(12) above. In some embodiments, the displacement calculation circuit 602 can further comprise an integrator circuit 602b to implement equation (13). In some embodiments, the integrator circuit 602b is configured to generate the plurality of normalized displacement values $\xi_k$ at a second, different sampling rate (e.g., the RF rate or a higher sampling rate).

The output generation circuit 604 is coupled to an output of the displacement calculation circuit 602 and is configured to receive the plurality of normalized displacement values $\xi_k$ from the displacement calculation circuit 602, over a correlation output path 610. In some embodiments, the output generation circuit 604 is further configured to receive the IQ distance d and the rotation angle $\phi_0$ from the displacement calculation circuit 602. Upon receiving the plurality of normalized displacement values $\xi_k$, the IQ distance d and the rotation angle $\phi_0$, the output generation circuit 604 is further configured to determine a plurality of output phase angles and a plurality of output radius values, in order to generate a plurality of interpolated output samples (e.g., the interpolated output samples 218b in FIG. 2) at the higher sampling rate. In some embodiments, the output generation circuit 604 is configured to generate both the plurality of output phase angles and the plurality of output radius values, however, in other embodiments, the output generation circuit 604 can be configured to generate either the plurality of output phase angles or the plurality of output radius values, associated with the plurality of interpolated output samples. In some embodiments, the plurality of output phase angles is determined based on equation (4) above and the plurality of output radius values is determined based on equation (6) above by applying the plurality of normalized displacement values $\xi_k$. In one example embodiment, the arctan($\xi$) function in equation (4) and the $\sqrt{1+\xi^2}$ function in equation (6) above are realized within the output generation circuit 604 using a lookup table (LUT), the details of which are given in FIG. 7 below. However, in other embodiments, the arctan($\xi$) function in equation (4) and the $\sqrt{1+\xi^2}$ function in equation (6) above can be realized differently, and the plurality of interpolated output samples can be determined using suitable approximation algorithms.

Figure 7:
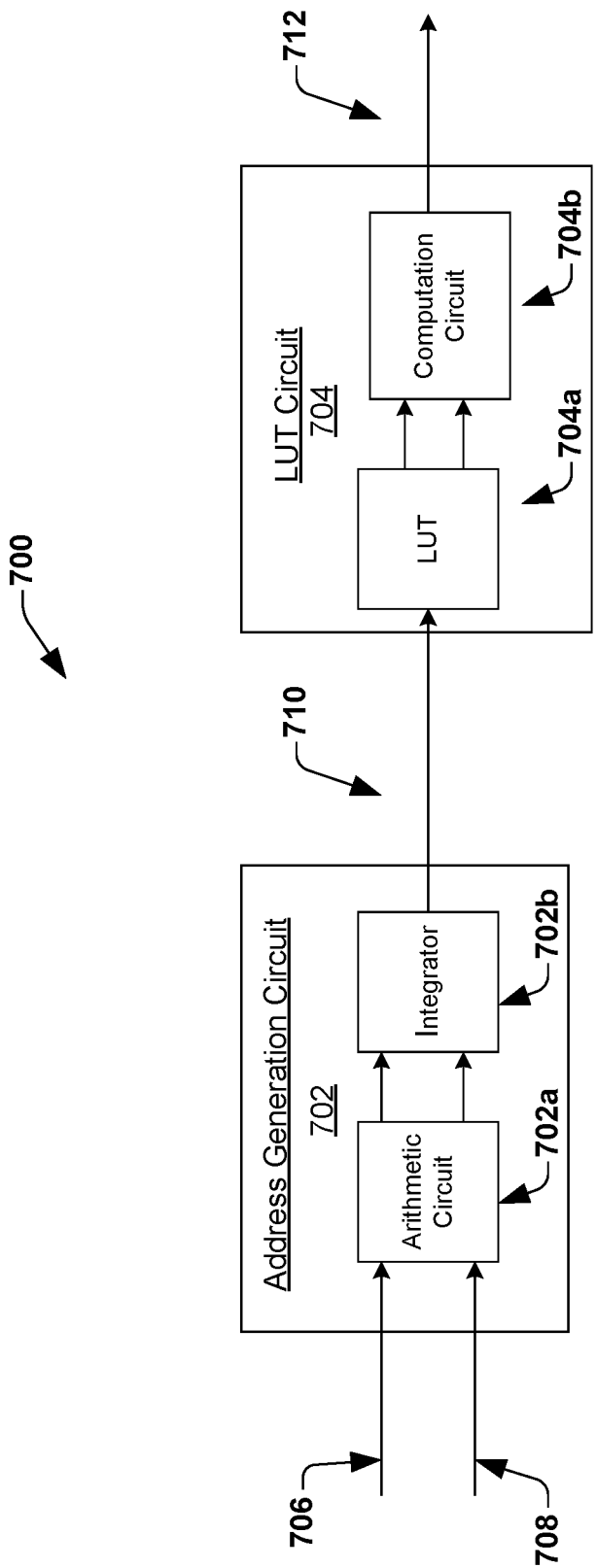
FIG. 7 depicts a block diagram of a lookup table (LUT) interpolation circuit, according to one embodiment of the disclosure.

FIG. 7 depicts a block diagram of a lookup table (LUT) interpolation circuit 700, according to one embodiment of the disclosure. In some embodiments, the LUT interpolation circuit 700 depicts a possible way of implementation of the mapped linear interpolation circuit 600 in FIG. 6. In this embodiment, the LUT interpolation circuit 700 is explained with respect to the mapped linear interpolation circuit 600 in FIG. 6 and the principle of operation explained in FIG. 4a, FIG. 4b and FIG. 5. The mapped linear interpolation circuit 700 comprises an address generation circuit 702 and an LUT circuit 704. In some embodiments, the address generation circuit 702 is similar to the displacement calculation circuit 602 in FIG. 6 and is configured to generate a plurality of LUT index values $\xi_k$. In some embodiments, the plurality of LUT index values $\xi_k$ correspond to the plurality of normalized displacement values $\xi_k$ in FIG. 6 above. In some embodiments, the LUT circuit 704 depicts on possible way of implementation of the output generation circuit 604 in FIG. 6 and can replace the output generation circuit 604 in some embodiments.

The LUT circuit 704 comprises a LUT 704a comprising a plurality of normalized phase angles and a plurality of normalized radius values, wherein each of the normalized phase angle and normalized radius value has a respective LUT index value associated therewith. Alternately, in other embodiments, the LUT 704a can comprise either the plurality of normalized phase angles or the plurality of normalized radius values, having the respective LUT index associated therewith. In some embodiments, the LUT index described herein can be mapped to the normalized displacement $\xi$. In some embodiments, the plurality of normalized phase angles and the plurality of normalized radius values in the LUT 704a are determined based on applying a plurality of predetermined LUT index values $\xi$ to the arctan($\xi$) in equation (4) and $\sqrt{1+\xi^2}$ in equation (6), respectively. In some embodiments, the LUT 704a defines one possible way of implementation of the arctan($\xi$) in equation (4) and $\sqrt{1+\xi^2}$ in equation (6). In some embodiments, the plurality of predetermined LUT index values $\xi$, for example, the number of LUT index values and their word length, to be utilized for populating the LUT 704a is determined based on the required resolution. In some embodiments, only positive values of the arctan($\xi$) in equation (4) and $\sqrt{1+\xi^2}$ in equation (6) are stored in the LUT 704a, due to the symmetry of the arctan($\xi$) and the hyperbola function $\sqrt{1+\xi^2}$. Also, in some embodiments, the values for arctan($\xi$) and $\sqrt{1+\xi^2}$, for large values of are not stored in the LUT 704a, as for large $\xi$, the values for the normalized phase angles are nearly constant and the radii are linear with respect to $\xi$. In some embodiments, the LUT 704a is populated with the plurality of normalized phase angles and the plurality of normalized radius values prior to receiving the input IQ signal (for example, when the LUT interpolator circuit 700 is initialized), and is only changed when the resolution requirement changes or for some other system level changes.

The address generation circuit 702 comprises an arithmetic circuit 702a configured to receive an input IQ signal 706 (e.g., the input IQ signal 216 in FIG. 2). In some embodiments, the input IQ signal 706 comprises a plurality of input IQ samples having a first sampling rate (e.g., a baseband rate or a lower sampling rate) associated therewith. In some embodiments, the arithmetic circuit 702a is further configured to receive a current interpolation ratio 708. Upon receiving the input IQ signal 706 and the current interpolation ratio 708, in some embodiments, the arithmetic circuit 702a is configured to normalize the input IQ signal based on rotating the normal vectors of IQ trajectories associated with the input IQ signal 706 on to an l-axis of a respective IQ plane, as shown in FIG. 4b above or to a Q-axis of the respective IQ plane. For each IQ trajectory associated with the input IQ signal 706, the arithmetic circuit 702a is further configured to determine IQ trajectory parameters comprising an IQ distance d, IQ trajectory length l, an IQ offset a and a rotation angle $\phi_0$, as explained above with respect to FIG. 4a above. In some embodiments, the IQ trajectory parameters can be determined at the arithmetic circuit 702a by using a coordinate rotation digital computer (CORDIC). Upon determining the IQ trajectory parameters, the arithmetic circuit 702a is configured to determine an initial LUT index value $\xi_0$ and a LUT difference index comprising a difference in LUT index value between successive LUT index values, for each IQ trajectory associated with the input IQ signal. In some embodiments, the initial LUT index value $\xi_0$ and the LUT difference index $\xi_\Delta$ for each IQ trajectory is determined at the arithmetic circuit 702a based on equations (7)-(12) above. In some embodiments, the initial LUT index value $\xi_0$ and the LUT difference index $\xi_\Delta$ correspond to the initial normalized displacement value $\xi_0$ and the difference in normalized displacement $\xi_\Delta$ given in equations (11) and (12), respectively.

The address generation circuit 702 further comprises an integrator circuit 702b configured to receive the initial LUT index value $\xi_0$ and the LUT difference index $\xi_\Delta$ from the arithmetic circuit 702a and determine a set of LUT index values $\xi_k$ based on equation (13) above. In some embodiments, the LUT index values $\xi_k$ are generated at the integrator circuit 702b at a higher rate (e.g., the RF clock rate).

In some embodiments, the integrator circuit 702b is further configured to provide the set of LUT index values $\xi_k$ to the LUT circuit 704, in order to access a set of normalized phase angles or a set of normalized radius values or both corresponding to the set of LUT index values $\xi_k$ from the LUT 704a. The LUT circuit 704 further comprises a computation circuit 704b configured to receive the set of normalized phase angles or the set of normalized radius values or both corresponding to the set of LUT index values $\xi_k$ from the LUT 704a and generate interpolated polar samples (e.g., the interpolated polar samples 218b in FIG. 2), based on implementing equations (4) and (6) above. In such embodiments, the values for arctan($\xi$) and $\sqrt{1+\xi^2}$ corresponding to the set of LUT index values $\xi_k$ are directly accessed from the LUT 704a for implementing the equations (4) and (6) above. In some embodiments, the computation circuit 704b is further configured to receive rotation angle $\phi_0$ and the IQ distance d from the arithmetic circuit 702a, in order to implement the equations (4) and (6) above.

Figure 8:
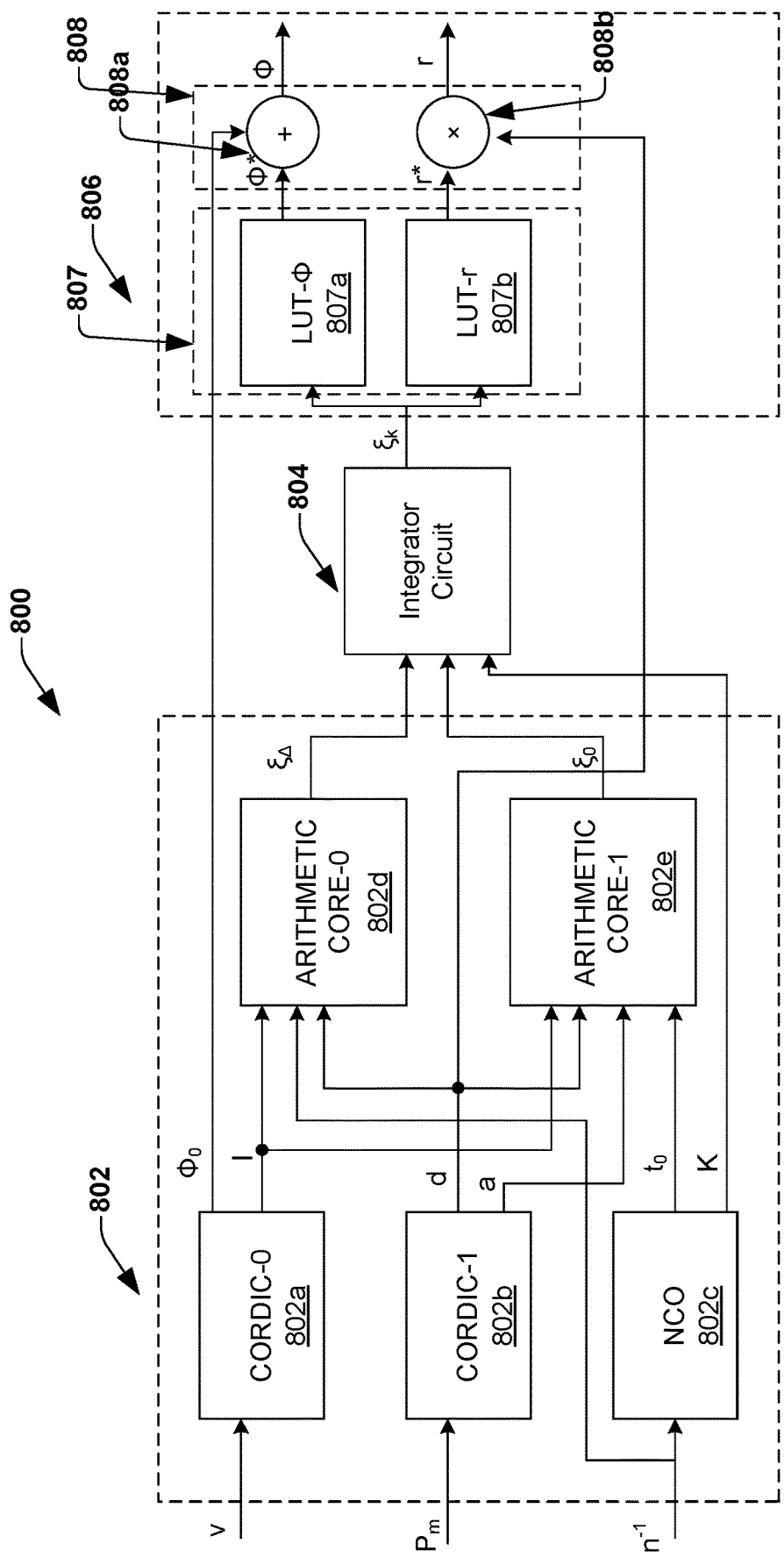
FIG. 8 depicts an example implementation of a lookup table (LUT) interpolation circuit, according to one embodiment of the disclosure.

FIG. 8 depicts an example implementation of a lookup table (LUT) interpolation circuit 800, according to one embodiment of the disclosure. In some embodiments, the LUT interpolation circuit 800 depicts one possible way of implementation of the LUT interpolation circuit 700 in FIG. 7. However, other possible ways of implementation of the LUT interpolation circuit 700 is also contemplated to be within the scope of this disclosure. FIG. 8 is explained herein with reference to the LUT interpolation circuit 700 in FIG. 7 and the principle of operation explained in FIG. 4a, FIG. 4b and FIG. 5. The LUT interpolation circuit 800 comprises an arithmetic circuit 802, an integrator circuit 804 and a LUT circuit 806. The arithmetic circuit 802 depicts one possible way of implementation of the arithmetic circuit 702a in FIG. 7 and can be included within the arithmetic circuit 702a in FIG. 7, in some embodiments.

The arithmetic circuit 802 comprises a coordinate rotation digital computer CORDIC-0 802a and a CORDIC-1 802b configured to receive information associated with an input IQ signal (e.g., the input IQ signal 706 in FIG. 7). In some embodiments, the CORDIC-0 is configured to rotate a vector v (i.e. a normal vector to a current IQ trajectory) associated with the input IQ signal on to an l-axis and determine the values for a rotation angle $\phi_0$ and an IQ trajectory length l, as explained above in FIG. 4b. In some embodiments, the CORDIC-1 reuses the rotation information of CORDIC-1 and rotate Pm (i.e., an IQ data point associated with the current IQ trajectory) associated with the input IQ signal and determine an IQ offset a and an IQ distance d as explained above in FIG. 4b. The arithmetic circuit 802 further comprises a numerically controlled oscillator (NCO) 802c configured to receive information on a current interpolation ratio (e.g., n$^{-1}$), where n is the current interpolation ratio and generate a time offset $t_0$ for a first RF sample for the current IQ trajectory and a total number of RF samples (i.e., K at the output of the NCO 802c in FIG. 8) on the current IQ trajectory based on implementing equations (7) and (9), respectively.

The arithmetic circuit 802 further comprises an arithmetic core-1 circuit 802e configured to receive the IQ offset a, the IQ distance d, the time offset to and the IQ trajectory length l, and generate an initial LUT index value $\xi_0$ based on implementing equation (11) above. In addition, the arithmetic circuit 802 comprises an arithmetic core-0 circuit 802d configured to receive the inverse interpolation ratio n$^{-1}$, the IQ distance d and the IQ trajectory length l, and generate an LUT difference index $\xi_\Delta$, based on implementing equation (12) above.

The integrator circuit 804 is coupled to the arithmetic circuit 802 and is configured to receive initial LUT index value $\xi_0$, the LUT difference index $\xi_\Delta$ and the total number of samples to be generated K from the arithmetic circuit 802. In some embodiments, the integrator circuit 804 is further configured to generate a set of LUT index values $\xi_k$ based on implementing equation (13) above. In some embodiments, the integrator circuit 804 operates at a higher rate (e.g., the RF rate) and generate the set of LUT index values $\xi_k$ at the RF rate. The LUT circuit 806 is coupled to the integrator circuit 804 and is configured to receive the set of LUT index values $\xi_k$ from the integrator circuit 804. The LUT circuit 806 comprises a LUT 807 configured to store a plurality of normalized phase angles and a plurality of normalized radius values, each of the plurality of normalized phase angles and the plurality of normalized radius values having a respective LUT index value associated therewith. In some embodiments, the LUT index described herein can be mapped to the normalized displacement $\xi$. In some embodiments, the plurality of normalized phase angles and the plurality of normalized radius values in the LUT 807 are determined based on applying a plurality of predetermined LUT index values $\xi$ to the arctan($\xi$) in equation (4) and $\sqrt{1+\xi^2}$ in equation (6), respectively. In some embodiments, the LUT 807 comprises a first LUT 807a configured to store the plurality of normalized phase angles and a second LUT 807b configured to store the plurality of normalized radius values.

In some embodiments, the LUT circuit 806 is further configured to access a set of normalized phase angles and a set of normalized radius values corresponding to the set of LUT index values $\xi_k$ from the first LUT 807a and the second LUT 807b, respectively. The LUT circuit 806 further comprises a computation circuit 808 configured to receive the set of normalized phase angles and the set of normalized radius values corresponding to the set of LUT index values $\xi_k$ from the LUT 807 and generate interpolated polar samples (e.g., the interpolated polar samples 218b in FIG. 2), based on implementing equations (4) and (6) above. In some embodiments, the computation circuit 808 is further configured to receive rotation angle $\phi_0$ and the IQ distance d from the arithmetic circuit 802, in order to implement the equations (4) and (6) above. In some embodiments, the estimation circuit 808 further comprises a first estimation circuit 808a configured to implement the equation (4) and a second estimation circuit 808b configured to implement the equation (6), in order to generate a set of output phase angles and a set of output radius values, respectively associated with the interpolated polar samples.

Figure 9:
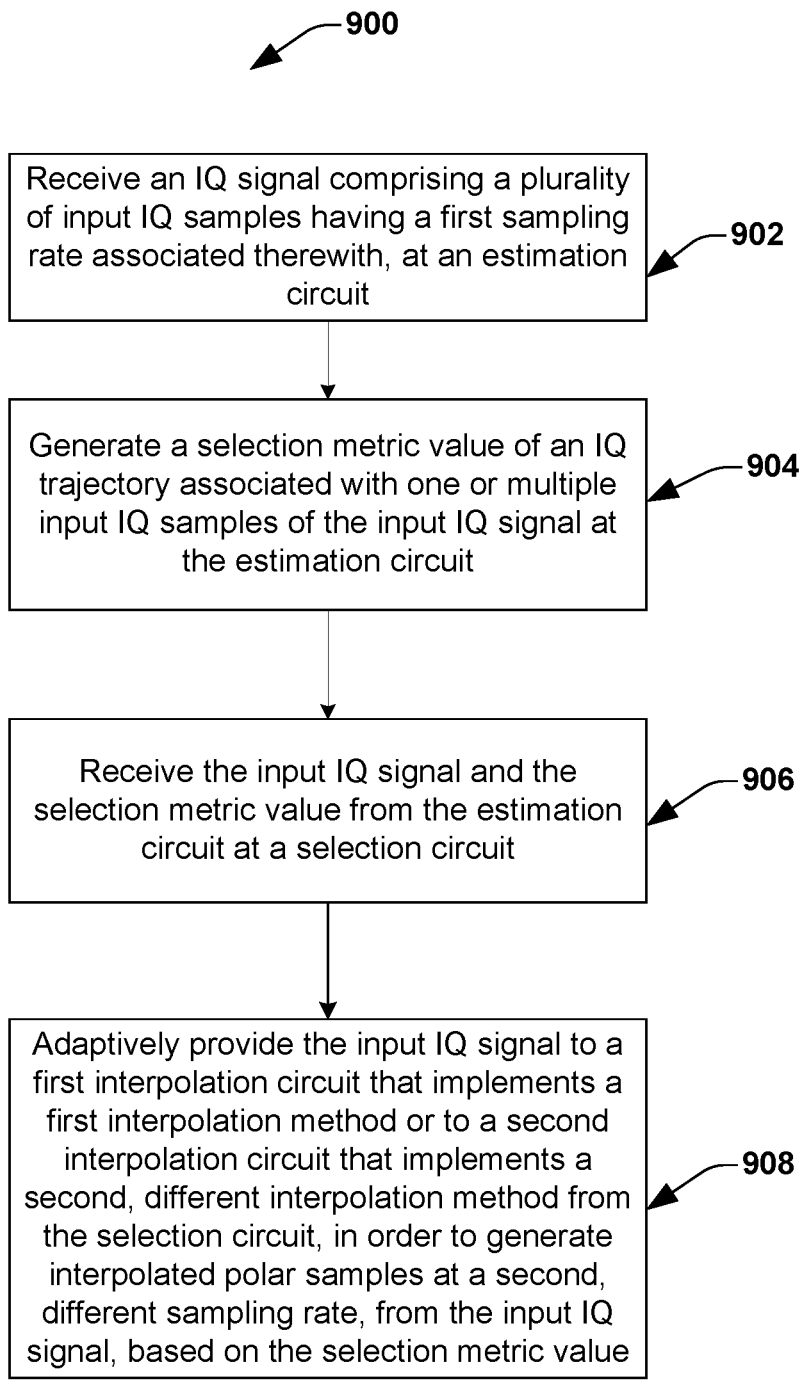
FIG. 9 illustrates a method of interpolation of polar signals in radio frequency (RF) transmitters, according to one embodiment of the disclosure.

FIG. 9 illustrates a method 900 of interpolation of polar signals in radio frequency (RF) transmitters, according to one embodiment of the disclosure. The method 900 is explained herein with reference to the polar transmitter 100 in FIG. 1 and the polar transmitter 200 in FIG. 2. However, in other embodiments, the method 900 is applicable to any RF transmitters. At 902, an input in-phase (I) quadrature (Q) signal (e.g., the input IQ signal 110 in FIG. 1) comprising a plurality of input IQ samples having a first sampling rate associated therewith is received at an estimation circuit (e.g., the estimation circuit 102 in FIG. 1). At 904, a selection metric value associated with a predetermined selection metric of an IQ trajectory associated with one or more input IQ samples of the input IQ signal is calculated at the estimation circuit. In some embodiments, the selection metric value is indicative of a position of the IQ trajectory associated with one or more input IQ samples with respect to the origin of an IQ plane associated therewith. At 906, the input IQ signal and the selection metric value from the estimation circuit is received at a selection circuit (e.g., the selection circuit 104 in FIG. 1). At 908, the input IQ signal is adaptively provided by the selection circuit to a first interpolation circuit (e.g., the first interpolation circuit 106) that implements a first interpolation method or to a second interpolation circuit (e.g., the second interpolation circuit 108) that implements a second, different interpolation method, for generating interpolated polar samples (e.g., the interpolated polar samples 118a or 118b) at a second, different sampling rate, from the input IQ signal, based on the selection metric value.

In some embodiments, the first interpolation circuit comprises a polar interpolation circuit (e.g., the polar interpolation circuit 206 in FIG. 2) and the second interpolation circuit comprises a mapped linear interpolation circuit (e.g., the mapped linear interpolation circuit 208 in FIG. 2). However, in other embodiments, the first interpolation circuit can comprise a mapped linear interpolation circuit and the second interpolation circuit can comprise a polar interpolation circuit. In some embodiments, the selection circuit is configured to provide the input IQ signal to the first interpolation circuit (i.e., the polar interpolation circuit 206), when the selection metric value (e.g., an IQ radius estimate) indicates that the IQ trajectory is farther away from the origin. Further, the selection circuit is configured to provide the input IQ signal to the second interpolation circuit (i.e., the mapped linear interpolation circuit 208), when the selection metric value (e.g., the IQ radius estimate) indicates that the IQ trajectory is closer to the origin. However, in other embodiments, the selection circuit is configured to provide the input IQ signal to the first interpolation circuit or to the second interpolation circuit, based on predetermined selection metric ranges, for example, a first predetermined metric range and a second, different predetermined metric range.

Figure 10:
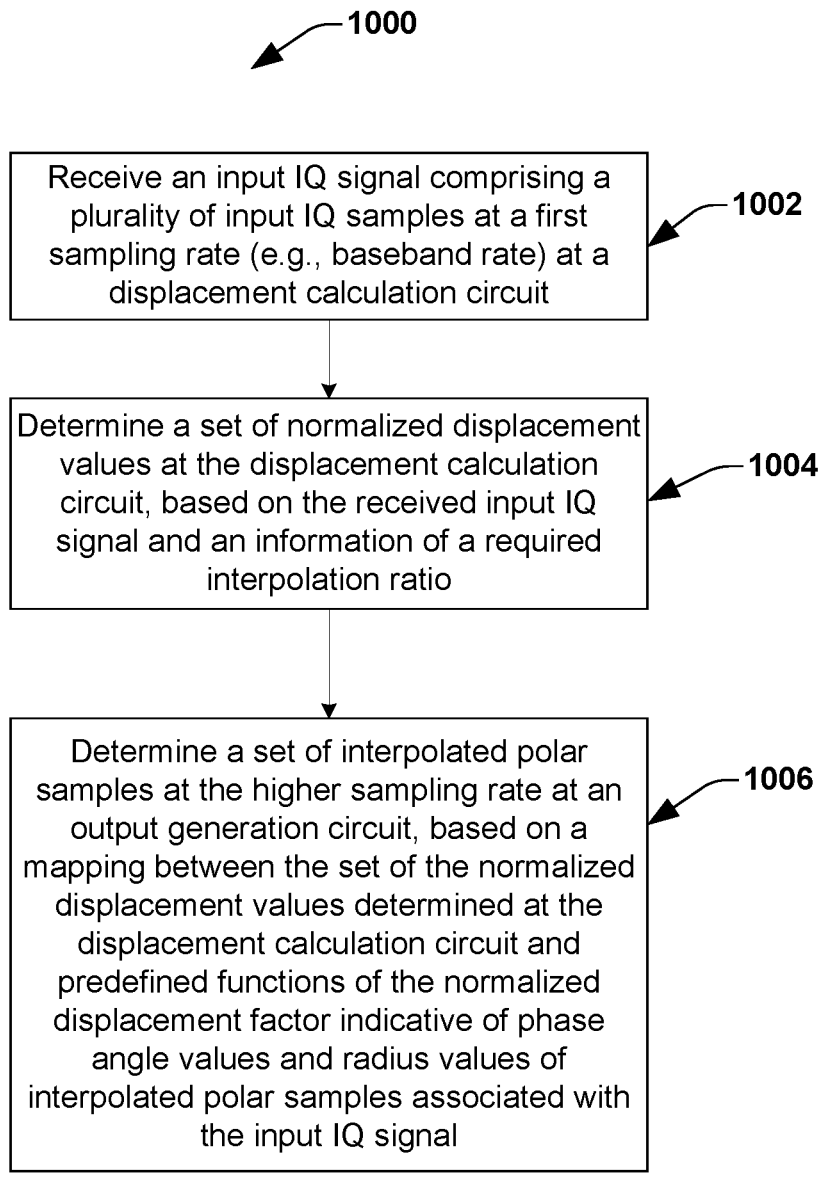
FIG. 10 illustrates a method for a linear interpolator circuit, according to one embodiment of the disclosure.

FIG. 10 illustrates a method 1000 for a linear interpolator circuit, according to one embodiment of the disclosure. The method 1000 is explained herein with reference to the linear interpolator circuit 600 in FIG. 6. However, in other embodiments, the method 1000 can be applied to any mapped linear interpolation circuit associated with polar transmitters. At 1002, an input IQ signal (e.g., the input IQ signal 606 in FIG. 6) comprising a plurality of input IQ samples at a first sampling rate (e.g., baseband rate) is received at a displacement calculation circuit (e.g., the displacement calculation circuit 602 in FIG. 6). At 1004, a set of normalized displacement values $\xi_k$ comprising a set of values associated with a normalized displacement $\xi$, is determined at the displacement calculation circuit, based on the received input IQ signal and an information of a required interpolation ratio (e.g., the interpolation ratio 608 in FIG. 6). In some embodiments, the set of normalized displacement values is determined based on implementing the equations (7)-(13) above. At 1006, a set of interpolated polar samples at a higher sampling rate (e.g., RF rate) is generated at an output generation circuit (e.g., the output generation circuit 604 in FIG. 6), based on a mapping between the set of the normalized displacement values determined at the displacement calculation circuit and predefined functions of the normalized displacement indicative of phase angle values or radius values or both of the interpolated polar samples (e.g., the interpolated polar samples 612 in FIG. 6) associated with the input IQ signal. In some embodiments, the predefined functions of the normalized displacement comprise the arctan($\xi$) in equation (4) and $\sqrt{1+\xi^2}$ in equation (6) above. In some embodiments, mapping the set of the normalized displacement values $\xi_k$ determined at the displacement calculation circuit to the predefined functions of the normalized displacement $\xi$ is implemented at the output generation circuit, based on equations (4) and (6) above.

Figure 11:
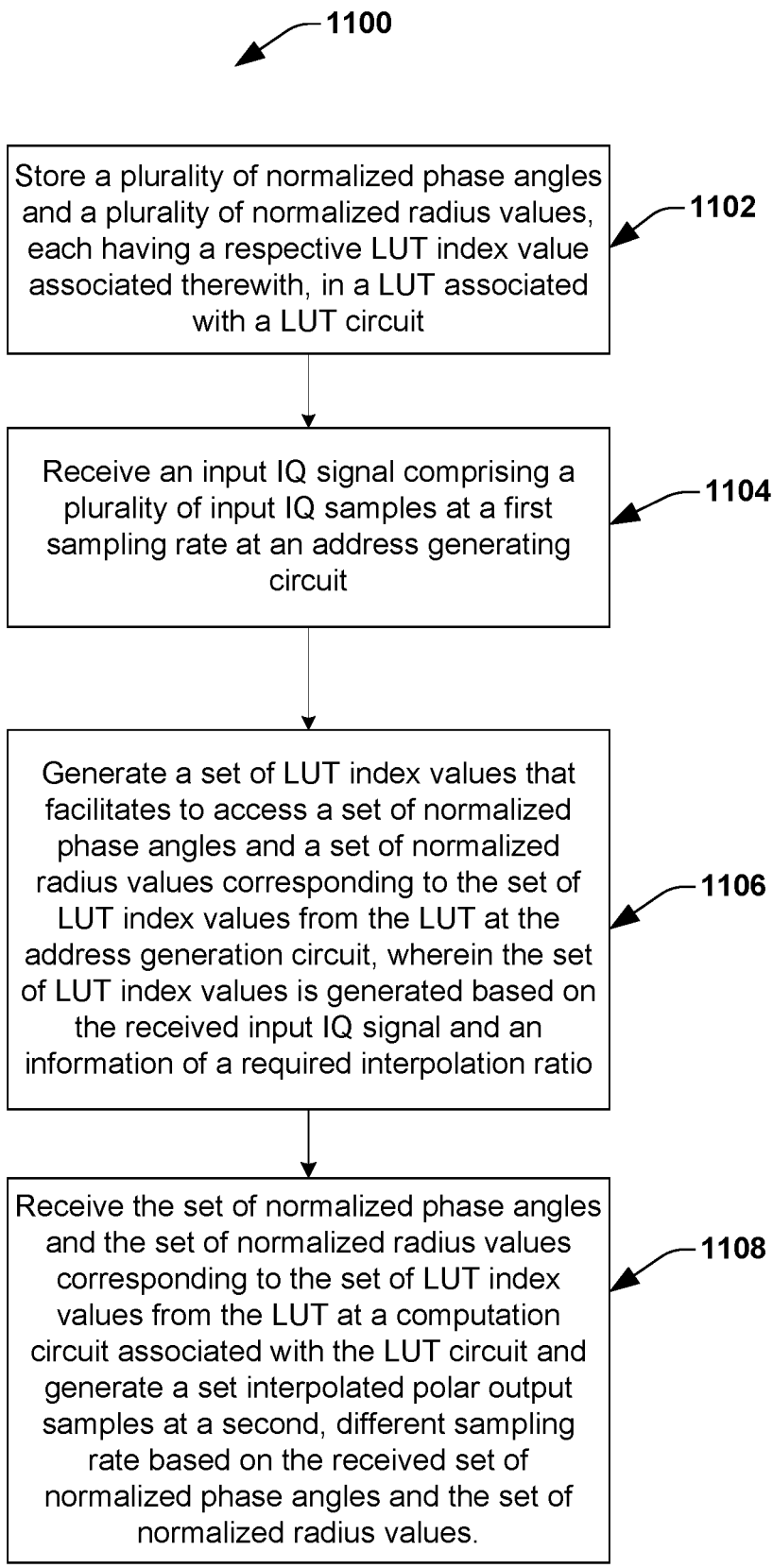
FIG. 11 illustrates a method for a lookup table (LUT) interpolation circuit, according to one embodiment of the disclosure.

FIG. 11 illustrates a method 1100 for a lookup table (LUT) interpolation circuit, according to one embodiment of the disclosure. The method 1100 is explained herein with reference to the LUT interpolator circuit 700 in FIG. 7. However, in other embodiments, the method 1100 can be applied to any mapped linear interpolation circuit associated with polar transmitters. At 1102, a plurality of normalized phase angles or a plurality of normalized radius values or both, each having a respective LUT index value associated therewith, is stored in a LUT (e.g., the LUT 704a in FIG. 7) associated with an LUT circuit (e.g., the LUT circuit 704 in FIG. 7). In some embodiments, the plurality of normalized phase angles and the plurality of normalized radius values in the LUT are determined based on applying a plurality of predetermined LUT index values $\xi$ to the arctan($\xi$) in equation (4) and $\sqrt{1+\xi^2}$ in equation (6), respectively. At 1104, an input IQ signal (e.g., the input IQ signal 706 in FIG. 7) comprising a plurality of input IQ samples at a first sampling rate is received at an address generating circuit (e.g., the address generating circuit 702 in FIG. 7).

At 1106, a set of LUT index values that facilitates to access a set of normalized phase angles and a set of normalized radius values corresponding to the set of LUT index values from the LUT, is generated at the address generation circuit (in particular, within the arithmetic circuit 702a and the integrator circuit 702b). In some embodiments, the set of LUT index values is generated at the address generation circuit based on the received input IQ signal and an information of a required interpolation ratio, by utilizing equations (7)-(13) above. In some embodiments, the set of normalized phase angles or the set of normalized radius values or both are accessed from the LUT based on a mapping between the set of LUT index values generated at the address generating circuit and the LUT index values associated with the normalized phase angles and the normalized radius values stored in the LUT. At 1108, the set of normalized phase angles or the set of normalized radius values or both corresponding to the set of LUT index values from the LUT is received at a computation circuit (e.g., the computation circuit 704b in FIG. 7) associated with the LUT circuit and a set interpolated polar output samples at a second, different sampling rate is generated based on the received set of normalized phase angles or the set of normalized radius values or both. In some embodiments, the set of interpolated polar output samples at a second, different sampling rate is generated at the computation circuit based on implementing equations (4) and (6) above. For example, a set of interpolated phase angles are generated based on adding (or subtracting) a rotation angle $\phi_0$ to each normalized phase angle of the received set of normalized phase angles, as shown in equation (4). Further, a set of output radius values are generated based on multiplying each normalized radius value of the received set of normalized radius values by an IQ distance d, as shown in equation (6). In such embodiments, the computation circuit is further configured to receive rotation angle $\phi_0$ and the IQ distance d from the address generation circuit, in order to implement the equations (4) and (6) above.

While the methods are illustrated, and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for interpolation of polar signals in RF transmitters, comprising an estimation circuit configured to receive an input in-phase (I) quadrature (Q) signal comprising a plurality of input IQ samples having a first sampling rate associated therewith; and determine a selection metric value associated with a predetermined selection metric, based on the input IQ signal, wherein the selection metric value is indicative of a position of an IQ trajectory associated with one or more input IQ samples of the input IQ signal with respect to the origin of an IQ plane; and a selection circuit coupled to the estimation circuit, and configured to receive the input IQ signal and the selection metric value; and adaptively provide the input IQ signal to a first interpolation circuit that implements a first interpolation method or to a second interpolation circuit that implements a second, different interpolation method for generating interpolated polar samples at a second, different sampling rate, from the input IQ signal, based on the selection metric value.

Example 2 is an apparatus including the subject matter of claim 1, wherein the first interpolation circuit comprises a mapped linear interpolation circuit configured to implement a mapped linear interpolation method comprising generating the interpolated polar samples at the second sampling rate comprising a higher sampling rate from the input IQ signal at the first sampling rate comprising a lower sampling rate, based on a mapping from IQ samples associated with IQ trajectories of the input IQ signal to polar samples at the higher sampling rate based on one or more predefined functions indicative of polar representation of the IQ samples.

Example 3 is an apparatus including the subject matter of claims 1-2, including or omitting elements, wherein the selection circuit is configured to provide the input IQ signal to the mapped linear interpolation circuit, when the selection metric value is within a first predetermined range.

Example 4 is an apparatus including the subject matter of claims 1-3, including or omitting elements, wherein the second interpolation circuit comprises a polar interpolation circuit configured to implement a polar interpolation method comprising converting the input IQ signal at the lower sampling rate into polar samples at the lower sampling rate, thereby forming low rate polar samples and interpolating the low rate polar samples to generate the interpolated polar samples at the higher sampling rate.

Example 5 is an apparatus including the subject matter of claims 1-4, including or omitting elements, wherein the selection circuit is configured to provide the input IQ signal to the polar interpolation circuit, when the selection metric value is within a second, different predetermined range.

Example 6 is an apparatus including the subject matter of claims 1-5, including or omitting elements, wherein the selection metric value comprises an IQ radius estimate comprising a distance of the IQ trajectory from the origin of the IQ plane.

Example 7 is an apparatus including the subject matter of claims 1-6, including or omitting elements, wherein the first predetermined metric range comprises IQ radius estimates between a predetermined metric threshold and a predetermined value lower than the predetermined metric threshold, and the second predetermined metric range comprises IQ radius estimates between the predetermined metric threshold and a predetermined value higher than the predetermined metric threshold.

Example 8 is an apparatus including the subject matter of claims 1-7, including or omitting elements, wherein the mapped linear interpolation circuit comprises a displacement calculation circuit configured to receive the input IQ signal; and determine a set of normalized displacement values, based on the received input IQ signal and an information of a required interpolation ratio, wherein the set of normalized displacement values is associated with the higher sampling rate; and an output generation circuit configured to generate a set of interpolated polar samples at the higher sampling rate based on a correlation between the set of the normalized displacement values determined at the displacement calculation circuit and the predefined functions comprising predefined functions of the normalized displacement indicative of phase angle values of the interpolated polar samples or radius values of the interpolated polar samples or both, associated with the input IQ signal.

Example 9 is an apparatus including the subject matter of claims 1-8, including or omitting elements, wherein the displacement calculation circuit is further configured to normalize the input IQ signal based on a rotation of an IQ trajectory or a vector associated with the IQ trajectory, associated with the input IQ signal; and determine a number of the interpolated polar samples to be generated for the IQ trajectory, an initial time offset of the interpolated polar samples and a time difference between successive interpolated polar samples, based on the interpolation ratio, in order to determine the set of the normalized displacement values, wherein the number of the interpolated polar samples to be generated for the IQ trajectory corresponds to a number of normalized displacement values in the set of normalized displacement values generated at the displacement calculation circuit.

Example 10 is an apparatus including the subject matter of claims 1-9, including or omitting elements, wherein the predefined functions of the normalized displacement comprises a predefined phase angle function that facilitates to determine a phase angle associated with an interpolated polar sample, based on an information of a normalized displacement value.

Example 11 is an apparatus including the subject matter of claims 1-10, including or omitting elements, wherein the predefined functions of the normalized displacement further comprises a predefined radius function that facilitates to determine a radius associated with the interpolated polar sample, based on an information of a normalized displacement value.

Example 12 is an apparatus including the subject matter of claims 1-11, including or omitting elements, wherein generating the set of interpolated polar samples comprises determining a phase angle or a radius value or both corresponding to each of the interpolated polar samples of the set, based on the predefined phase angle function and the predefined radius function.

Example 13 is an apparatus including the subject matter of claims 1-12, including or omitting elements, wherein the output generation circuit comprises a lookup table (LUT) configured to store a plurality of phase angles or a plurality of radius values or both associated with the IQ trajectory, wherein each of the plurality of the phase angles and the radius values are determined based on the predefined phase angle function and the predefined radius function, respectively, and wherein each of the phase angles and the radius values in the LUT is associated with a respective LUT index value that corresponds to a normalized displacement value.

Example 14 is an apparatus including the subject matter of claims 1-13, including or omitting elements, wherein the set of interpolated polar samples is generated at the output generation circuit based on accessing a set of phase angles or a set of radius values or both corresponding to a set of LUT index values from LUT, wherein the set of LUT index values corresponds to the set of normalized displacement values determined at the displacement calculation circuit.

Example 15 is an apparatus including the subject matter of claims 1-14, including or omitting elements, wherein the output generation circuit further comprises a computation circuit configured to receive the set of phase angles or the set of radius values or both corresponding to the set of LUT index values from LUT, and generate the set of interpolated polar samples by utilizing one or more parameters associated with a rotation of an IQ trajectory associated with the input IQ signal.

Example 16 is a lookup table (LUT) based interpolator circuit, comprising a LUT circuit comprising an LUT configured to store a plurality of normalized phase angles or a plurality of normalized radius values or both, wherein each of the normalized phase angle and normalized radius value has a respective LUT index value associated therewith; and an address generating circuit configured to receive an input IQ signal comprising a plurality of input IQ samples at a first sampling rate; and generate a set of LUT index values at a second, different, sampling rate, in order to access a set of normalized phase angles or a set of normalized radius values or both, corresponding to the set of LUT index values from the LUT, wherein the set of LUT index values is generated based on the received input IQ signal and an information of a required interpolation ratio.

Example 17 is a circuit including the subject matter of claim 16, wherein the address generating circuit further comprises an arithmetic circuit configured to determine an initial LUT index value and a LUT difference index comprising a difference in LUT index value between successive LUT index values, in order to generate the set of LUT index values, based on a rotation of an IQ vector associated with two successive IQ samples of the input IQ signal and the information of the required interpolation ratio.

Example 18 is a circuit including the subject matter of claims 16-17, including or omitting elements, wherein the address generating circuit further comprises an integrator circuit coupled to the arithmetic circuit and configured to generate the set of LUT index values based on the initial LUT index value, the LUT difference index and a number of interpolated polar samples required for the current IQ vector, wherein the number of interpolated polar samples is determined based on the required interpolation ratio.

Example 19 is a circuit including the subject matter of claims 16-18, including or omitting elements, wherein the LUT circuit further comprises computation circuit configured to receive the set of normalized phase angles or the set of normalized radius values or both corresponding to the set of LUT index values from the LUT and generate a set interpolated polar output samples at the second, different sampling rate based thereon.

Example 20 is a circuit including the subject matter of claims 16-19, including or omitting elements, wherein generating the interpolated polar output samples at the computation circuit comprises generating a set of output phase angles associated with the interpolated polar output samples based on modifying each of the set of normalized phase angles by a rotation angle associated with the IQ vector; and generating a set of output radius values associated with the interpolated polar output samples based on modifying each of the set of normalized radius values by an IQ distance comprising a value of a distance of the IQ vector from the origin of the IQ plane.

Example 21 is a circuit including the subject matter of claims 16-20, including or omitting elements, wherein the LUT further comprises a first LUT configured to store the plurality of normalized phase angles and a second, different LUT configured to store the plurality of normalized radius values.

Example 22 is a circuit including the subject matter of claims 16-21, including or omitting elements, wherein the plurality of normalized phase angles and the plurality of normalized radius values in the LUT are generated by applying a plurality of predetermined LUT index values to a predefined phase angle function and a predefined radius function, respectively, wherein the predefined phase angle function and the predefined radius function are defined as functions of LUT index.

Example 23 is an apparatus for mapped linear interpolation of polar signals in RF transmitters, comprising a displacement calculation circuit configured to receive an input IQ signal comprising a plurality of input IQ samples at a first sampling rate; and determine a set of normalized displacement values comprising a set of values associated with a normalized displacement, based on the received input IQ signal and an information of a required interpolation ratio; and an output generation circuit configured to generate a set of interpolated polar samples at a second, different sampling rate based on a mapping between the set of the normalized displacement values, and one or more predefined functions of the normalized displacement indicative of phase angle values of the interpolated polar samples or radius values of interpolated polar samples or both, associated with the input IQ signal.

Example 24 is an apparatus including the subject matter of claim 23, wherein the displacement calculation circuit is further configured to normalize the input IQ signal based on a rotation of an IQ trajectory associated with the input IQ signal; determine a number of the interpolated polar samples to be generated for the IQ trajectory and determine a time difference between successive interpolated polar samples to be generated, based on the interpolation ratio, prior to determining the plurality of the normalized displacement values, wherein the number of the interpolated polar samples to be generated for the IQ trajectory corresponds to a number of normalized displacement values in the set of normalized displacement values generated at the displacement calculation circuit.

Example 25 is an apparatus including the subject matter of claims 23-24, including or omitting elements, wherein the predefined functions of the normalized displacement comprise a predefined phase angle function that facilitates to determine a phase angle associated with an interpolated polar sample, based on an information of a normalized displacement value Example 26 is an apparatus including the subject matter of claims 23-25, including or omitting elements, wherein the predefined functions of the normalized displacement further comprise a predefined radius function that facilitates to determine a radius associated with the interpolated polar sample, based on an information of a normalized displacement value.

Example 27 is an apparatus including the subject matter of claims 23-26, including or omitting elements, wherein generating the set of interpolated polar samples at the output generation circuit comprises determining a phase angle or a radius value or both corresponding to each of the interpolated polar samples of the set, based on a mapping between the normalized displacement values, and the predefined phase angle function and the predefined radius function.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An apparatus for interpolation of polar signals in RF transmitters, comprises:
   an estimation circuit configured to:
      receive an input in-phase (I) quadrature (Q) signal comprising a plurality of input IQ samples having a first sampling rate associated therewith; and
      determine a selection metric value associated with a predetermined selection metric, based on the input IQ signal, wherein the selection metric value is indicative of a position of an IQ trajectory associated with one or more input IQ samples of the input IQ signal with respect to the origin of an IQ plane;
   a first interpolation circuit configured to implement a first interpolation method for generating interpolated polar samples at a second, different sampling rate from the input IQ samples;
   a second interpolation circuit configured to implement a second, different, interpolation method for generating interpolated polar samples at the second sampling rate from the input IQ samples; and
   a selection circuit coupled to the estimation circuit, and configured to:
      receive the input IQ signal and the selection metric value; and
      adaptively provide the input IQ signal either to the first interpolation circuit or to the second interpolation circuit based on the selection metric value.

2. The apparatus of claim 1, wherein the first interpolation circuit comprises a mapped linear interpolation circuit configured to implement a mapped linear interpolation method comprising generating the interpolated polar samples at the second sampling rate comprising a higher sampling rate from the input IQ signal at the first sampling rate comprising a lower sampling rate, based on a mapping from IQ samples associated with IQ trajectories of the input IQ signal to polar samples at the higher sampling rate based on one or more predefined functions indicative of polar representation of the IQ samples.

3. The apparatus of claim 2, wherein the selection circuit is configured to provide the input IQ signal to the mapped linear interpolation circuit, when the selection metric value is within a first predetermined range.

4. The apparatus of claim 3, wherein the second interpolation circuit comprises a polar interpolation circuit configured to implement a polar interpolation method comprising converting the input IQ signal at the lower sampling rate into polar samples at the lower sampling rate, thereby forming low rate polar samples and interpolating the low rate polar samples to generate the interpolated polar samples at the higher sampling rate.

5. The apparatus of claim 4, wherein the selection circuit is configured to provide the input IQ signal to the polar interpolation circuit, when the selection metric value is within a second, different predetermined range.

6. The apparatus of claim 2, wherein the mapped linear interpolation circuit comprises:
a displacement calculation circuit configured to:
receive the input IQ signal; and
determine a set of normalized displacement values, based on the received input IQ signal and an information of a required interpolation ratio, wherein the set of normalized displacement values is associated with the higher sampling rate; and
an output generation circuit configured to:
generate a set of interpolated polar samples at the higher sampling rate based on a correlation between the set of the normalized displacement values determined at the displacement calculation circuit and the predefined functions comprising predefined functions of the normalized displacement indicative of phase angle values of the interpolated polar samples or radius values of the interpolated polar samples or both, associated with the input IQ signal.

7. The apparatus of claim 6, wherein the displacement calculation circuit is further configured to:
normalize the input IQ signal based on a rotation of an IQ trajectory or a vector associated with the IQ trajectory, associated with the input IQ signal; and
determine a number of the interpolated polar samples to be generated for the IQ trajectory, an initial time offset of the interpolated polar samples and a time difference between successive interpolated polar samples, based on the interpolation ratio, in order to determine the set of the normalized displacement values,
wherein the number of the interpolated polar samples to be generated for the IQ trajectory corresponds to a number of normalized displacement values in the set of normalized displacement values generated at the displacement calculation circuit.

8. The apparatus of claim 6, wherein the predefined functions of the normalized displacement comprises a predefined phase angle function that facilitates to determine a phase angle associated with an interpolated polar sample, based on an information of a normalized displacement value.

9. The apparatus of claim 8, wherein the predefined functions of the normalized displacement further comprises a predefined radius function that facilitates to determine a radius associated with the interpolated polar sample, based on an information of a normalized displacement value.

10. The apparatus of claim 9, wherein generating the set of interpolated polar samples comprises determining a phase angle or a radius value or both corresponding to each of the interpolated polar samples of the set, based on the predefined phase angle function and the predefined radius function.

11. The apparatus of claim 9, wherein the output generation circuit comprises a lookup table (LUT) configured to store a plurality of phase angles or a plurality of radius values or both associated with the IQ trajectory, wherein each of the plurality of the phase angles and the radius values are determined based on the predefined phase angle function and the predefined radius function, respectively, and wherein each of the phase angles and the radius values in the LUT is associated with a respective LUT index value that corresponds to a normalized displacement value.

12. The apparatus of claim 11, wherein the set of interpolated polar samples is generated at the output generation circuit based on accessing a set of phase angles or a set of radius values or both corresponding to a set of LUT index values from LUT, wherein the set of LUT index values corresponds to the set of normalized displacement values determined at the displacement calculation circuit.

13. The apparatus of claim 12, wherein the output generation circuit further comprises a computation circuit configured to receive the set of phase angles or the set of radius values or both corresponding to the set of LUT index values from LUT, and generate the set of interpolated polar samples by utilizing one or more parameters associated with a rotation of an IQ trajectory associated with the input IQ signal.

14. A lookup table (LUT) based interpolator circuit, comprises:
a LUT circuit comprising an LUT configured to store a plurality of normalized phase angles or a plurality of normalized radius values or both, wherein each of the normalized phase angle and normalized radius value has a respective LUT index value associated therewith; and
an address generating circuit configured to:
receive an input IQ signal comprising a plurality of input IQ samples at a first sampling rate; and
generate a set of LUT index values at a second, different, sampling rate, in order to access a set of normalized phase angles or a set of normalized radius values or both, corresponding to the set of LUT index values from the LUT, wherein the set of LUT index values is generated based on the received input IQ signal and an information of a required interpolation ratio,
wherein the normalized phase angles and the normalized radius values are obtained based on a normalized IQ trajectory of the input IQ samples, the normalized IQ trajectory being obtained by rotating an IQ trajectory of the input IQ samples by an angle of a normal vector to the IQ trajectory.

15. The circuit of claim 14, wherein the address generating circuit further comprises an arithmetic circuit configured to determine an initial LUT index value and a LUT difference index comprising a difference in LUT index value between successive LUT index values, in order to generate the set of LUT index values, based on a rotation of an IQ vector associated with two successive IQ samples of the input IQ signal and the information of the required interpolation ratio.

16. The circuit of claim 15, wherein the address generating circuit further comprises an integrator circuit coupled to the arithmetic circuit and configured to generate the set of LUT index values based on the initial LUT index value, the LUT difference index and a number of interpolated polar samples required for the current IQ vector, wherein the number of interpolated polar samples is determined based on the required interpolation ratio.

17. The circuit of claim 16, wherein the LUT circuit further comprises computation circuit configured to receive the set of normalized phase angles or the set of normalized radius values or both corresponding to the set of LUT index values from the LUT and generate a set interpolated polar output samples at the second, different sampling rate based thereon.

18. The circuit of claim 17, wherein generating the interpolated polar output samples at the computation circuit comprises:
generating a set of output phase angles associated with the interpolated polar output samples based on modifying each of the set of normalized phase angles by a rotation angle associated with the IQ vector; and generating a set of output radius values associated with the interpolated polar output samples based on modifying each of the set of normalized radius values by an IQ distance comprising a value of a distance of the IQ vector from the origin of the IQ plane.

19. The circuit of claim 14, wherein the LUT further comprises a first LUT configured to store the plurality of normalized phase angles and a second, different LUT configured to store the plurality of normalized radius values.

20. The circuit of claim 14, wherein the plurality of normalized phase angles and the plurality of normalized radius values in the LUT are generated by applying a plurality of predetermined LUT index values to a predefined phase angle function and a predefined radius function, respectively, wherein the predefined phase angle function and the predefined radius function are defined as functions of LUT index.

21. An apparatus for mapped linear interpolation of polar signals in RF transmitters, comprises:
    a displacement calculation circuit configured to:
        receive an input IQ signal comprising a plurality of input IQ samples at a first sampling rate; and
        normalize an IQ trajectory associated with the input IQ samples, determine a set of normalized displacement values comprising a set of values associated with a normalized displacement corresponding to each sampling point on the IQ trajectory, based on the received input IQ signal and an information of a required interpolation ratio, wherein the normalized displacement is x/d, where x is a displacement of the sampling point along the normalized IQ trajectory and d is a distance of the normalized IQ trajectory from an origin of IQ plain; and
    an output generation circuit configured to:
        generate a set of interpolated polar samples at a second, different sampling rate based on a mapping between the set of the normalized displacement values, and one or more predefined functions of the normalized displacement indicative of phase angle values of the interpolated polar samples or radius values of interpolated polar samples or both, associated with the input IQ signal.

22. The apparatus of claim 21, wherein the displacement calculation circuit is further configured to:
    normalize the input IQ signal based on a rotation of an IQ trajectory associated with the input IQ signal;
    determine a number of the interpolated polar samples to be generated for the IQ trajectory and determine a time difference between successive interpolated polar samples to be generated, based on the interpolation ratio, prior to determining the plurality of the normalized displacement values,
    wherein the number of the interpolated polar samples to be generated for the IQ trajectory corresponds to a number of normalized displacement values in the set of normalized displacement values generated at the displacement calculation circuit.

23. The apparatus of claim 21, wherein the predefined functions of the normalized displacement comprise a predefined phase angle function that facilitates to determine a phase angle associated with an interpolated polar sample, based on an information of a normalized displacement value.

24. The apparatus of claim 21, wherein the predefined functions of the normalized displacement further comprise a predefined radius function that facilitates to determine a radius associated with the interpolated polar sample, based on an information of a normalized displacement value.

25. The apparatus of claim 21, wherein generating the set of interpolated polar samples at the output generation circuit comprises determining a phase angle or a radius value or both corresponding to each of the interpolated polar samples of the set, based on a mapping between the normalized displacement values, and the predefined phase angle function and the predefined radius function.

* * * * *